United States Patent [19]
Amos

[11] Patent Number: 5,369,511
[45] Date of Patent: Nov. 29, 1994

[54] METHODS OF AND APPARATUS FOR MANIPULATING ELECTROMAGNETIC PHENOMENON

[76] Inventor: Carl R. Amos, 8310 Lincoln La., #202, McLean, Va. 22101

[21] Appl. No.: 847,050
[22] PCT Filed: Aug. 21, 1990
[86] PCT No.: PCT/US90/04726
   § 371 Date: Feb. 18, 1992
   § 102(e) Date: Feb. 18, 1992
[87] PCT Pub. No.: WO91/02992
   PCT Pub. Date: Mar. 7, 1991

Related U.S. Application Data

[63] Continuation-in-part of Ser. No. 396,201, Aug. 21, 1989, abandoned.

[51] Int. Cl.[5] ........... G02B 5/18; G02B 27/42; G02B 5/08; G03H 1/04
[52] U.S. Cl. .......................... 359/15; 359/30; 359/107; 359/562; 359/850
[58] Field of Search ............ 359/30, 558, 559, 562, 359/564, 578, 857, 15, 19, 107, 108, 850

[56] References Cited

U.S. PATENT DOCUMENTS

| | | | |
|---|---|---|---|
| 3,511,554 | 3/1970 | Osterberg et al. | 359/30 |
| 3,800,298 | 3/1974 | Ogura et al. | 359/30 |
| 4,050,036 | 9/1977 | Chambers et al. | |
| 4,370,026 | 1/1983 | Dubroeucq et al. | 359/578 |
| 4,793,694 | 12/1988 | Liu | 359/857 |

*Primary Examiner*—Martin Lerner

[57] ABSTRACT

Methods of and apparatus for manipulating beamed electromagnetic phenomenon comprises a generator (20) of aligned conical or pyramidal elements (21a–21f) each having conical or pyramidal inner and outer surfaces (24a–24f and 23a–23f). When the beamed electromagnetic phenomenon includes a zero-order component the elements (21a–21f) minimize or eliminate the zero-order component allowing for devices such as on-axis holographic displays, demodulators and optical processors for computers.

36 Claims, 34 Drawing Sheets

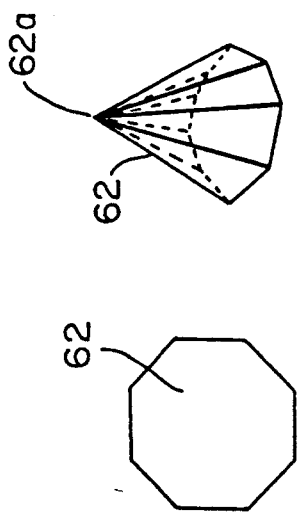
FIG. 21A  FIG. 21B
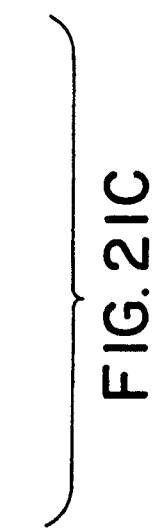
FIG. 21C
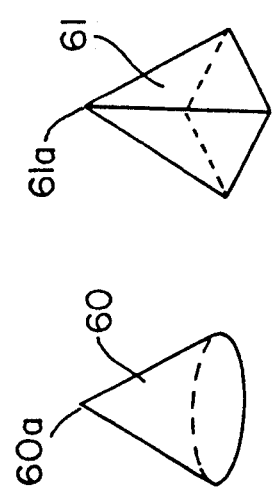
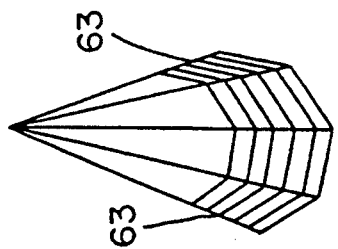
FIG. 22C
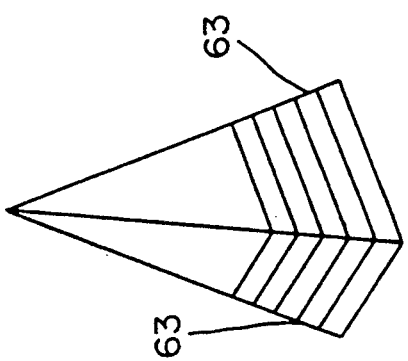
FIG. 22B
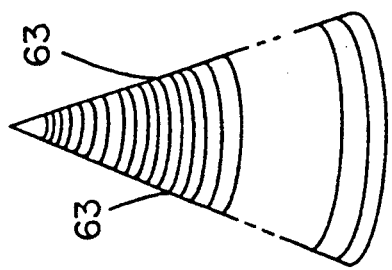
FIG. 22A

FIG. 26
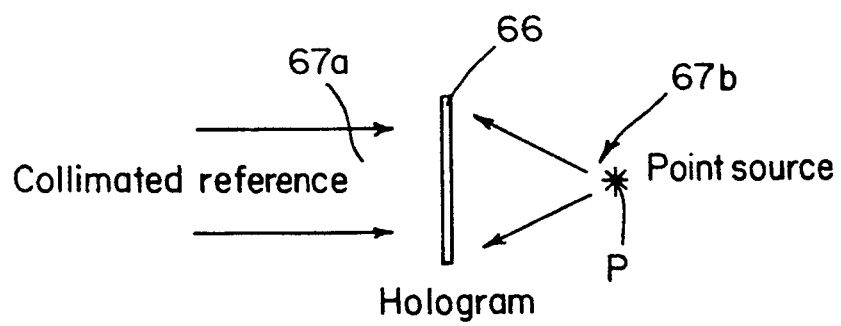
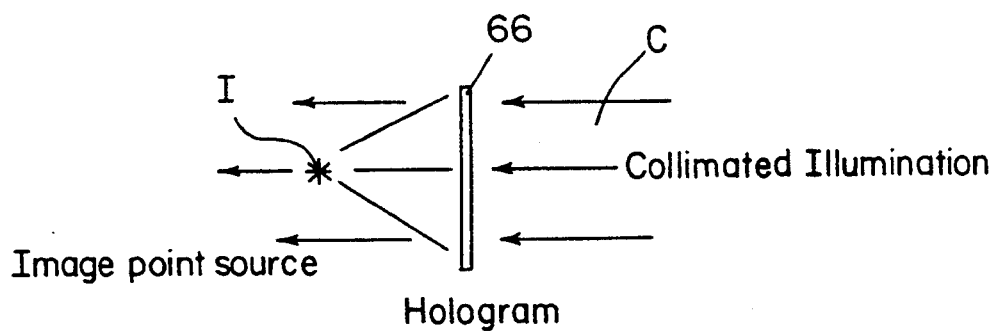
FIG. 27

FIG. 28
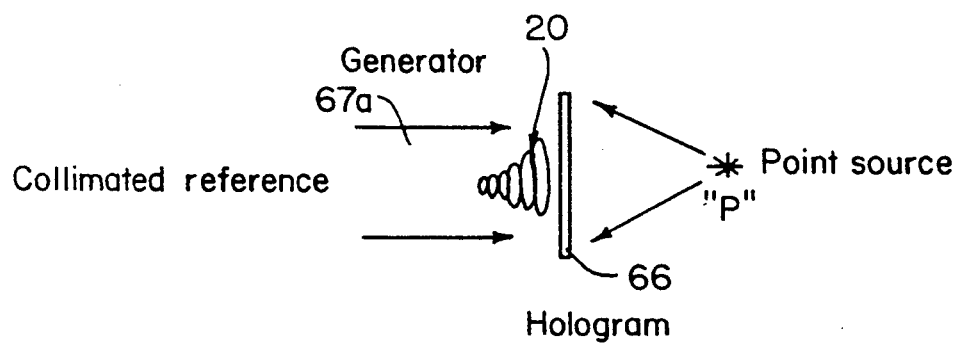
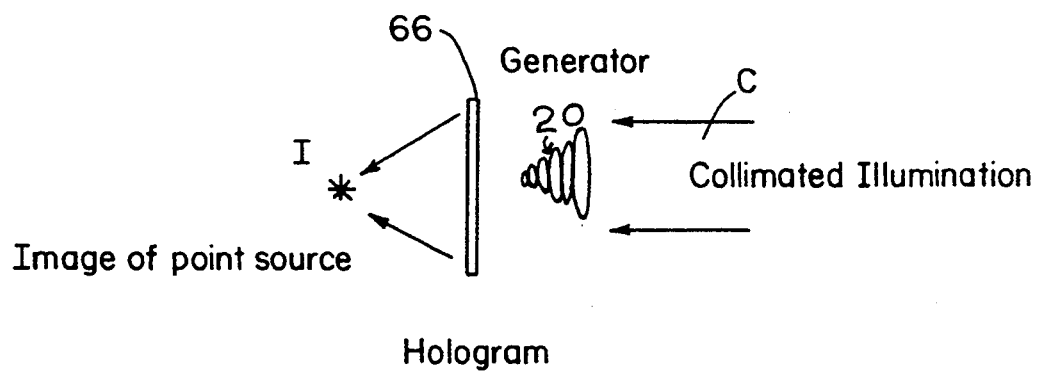
FIG. 29A

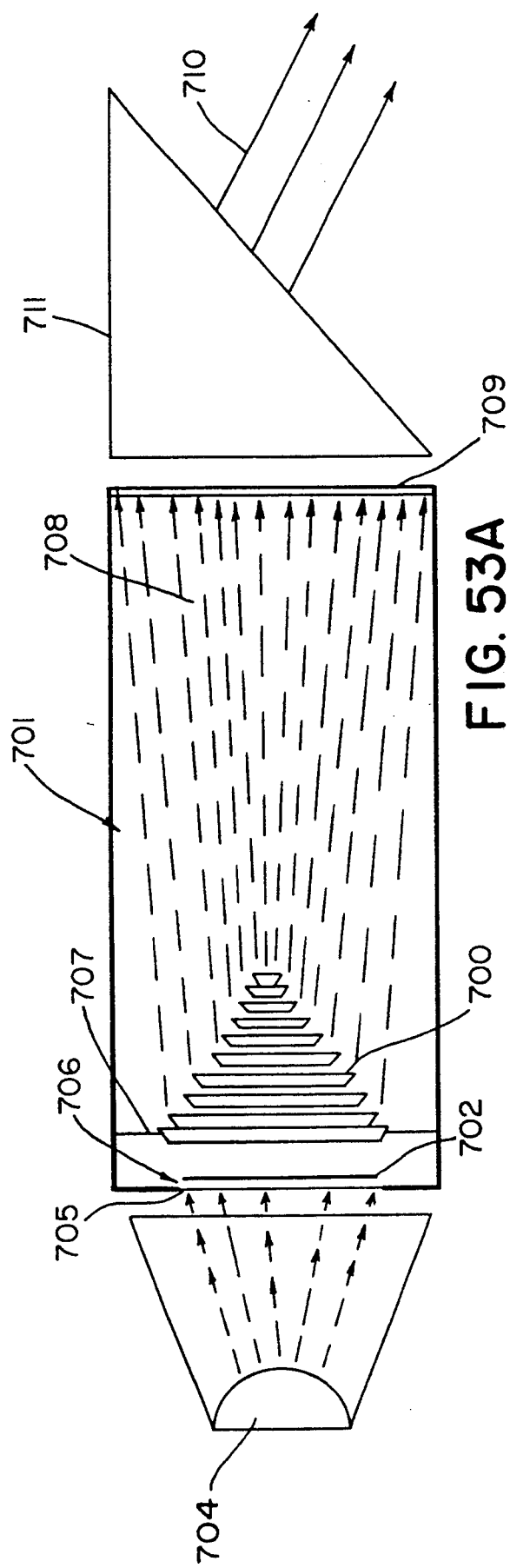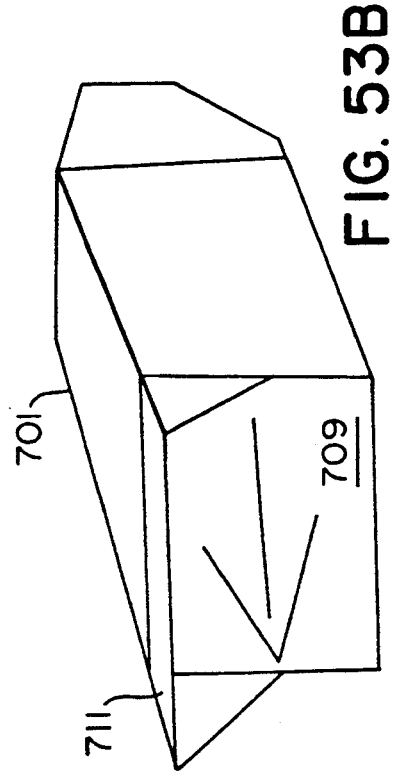
FIG. 53A
FIG. 53B

METHODS OF AND APPARATUS FOR MANIPULATING ELECTROMAGNETIC PHENOMENON

This application is a continuation-in-part of prior U.S. application Ser. No. 07/396,201, filed on Aug. 21, 1989, abandoned; and corresponds to Patent Cooperation Treaty (PCT) application No. PCT/US90/04726.

BACKGROUND OF THE INVENTION

1. Field of the Invention

The instant invention is directed to methods of and apparatus for manipulating electromagnetic phenomenon. More particularly, the instant invention is directed to methods of and apparatus for manipulating electromagnetic phenomenon to convey information utilizing substantial portions of visible and invisible spectra to manipulate information, whether that information is in the form of pictorial displays, such as holographic displays; in the form of numerical information, such as digital or analog numerical information; or in the form of communication signals, wherein the signals are selected from any portion of the electromagnetic spectrum.

2. Prior Art

One of a number of fields to which the instant invention is pertinent is the field of holography. In order to create a holographic image, it is necessary to superimpose two coherent light beams which are incident on the same photographic plate or other suitable recording device. One beam is known as the "object beam" and the other beam as the "reference beam". In "off-axis holography", the beams are separated by an angle $\theta$, which is typically 45°. The term "off axis" is utilized because the angle $\theta$ between the beams results in the axes of the beams not being coaxial. The general equation of holography is exceedingly complex and does not lend itself to any solution other than a numerical solution. The complexity of the equation is readily apparent when one considers two coherent waves $S_r$ (the reference wave) and $S_b$ (the object wave) with the waves being incident on the same photographic plate or other recording device, wherein:

$$S_b = A_b e^{-i\theta}$$

$$S_r = A_r e^{-i\alpha}$$

Since the intensity at any point (x,y) in recording medium is given by the equation:

$$I = I(x;y) \times I^*(x;y)$$

therefore, $$I = A^2_b + A^2_r + A_b A_r \exp\{i(\theta(x;y) + \alpha(x;y))\} + A_b A_r \exp[-i(\theta(x;y) - \alpha(x;y))]$$

There is no limitation on the content of $S_b$ and $S_r$, but, in accordance with the practices of the prior art, one is a "plain wave", while the other is modulated with object information.

It can be readily seen that if $\alpha = \theta$, waves $S_b$ and $S_r$ are coaxial, resulting in "in-line" holography. When $\alpha = \theta$, the equation becomes greatly simplified. However, the prior art approaches have not produced viable holograms because prior art in-line devices produce double images, zero order aberrations, or both. The zero-order problem is a long-standing problem and is set forth in U.S. Pat. No. 3,944,322, incorporated hereby reference and assigned to Polaroid Corporation. An in-line system was demonstrated by the originator of holography, Dennis Gabor, who in 1971 received a Nobel Prize for his contribution. Gabor's device produced primitive holograms which, due to a lack of a coherent light source, were incapable of storing three-dimensional images. Off-axis configurations in which $\alpha$ and $\theta$ are different solve the double-image problem, but in many situations they are unsatisfactory because they are cumbersome and require a large air space to disperse the zero order light. In essence, off-axis configurations for off-axis holograms require considerably more space for operation than on-axis holograms. Exemplary of commercial off-axis holographic systems are the bar code readers used for checkout scanners in stores and disclosed in U.S. Pat. No. 4,415,224, incorporated herein by reference.

By substituting on-axis systems where off-axis systems are now used in the field of holography, considerable advantages will result in that if the art of holography is drastically simplified by using on-axis systems, holographic devices can be made much smaller and used for applications which in the past, if not unsuitable for holographic technology, have used that technology ineffectually.

A specific example of commercially available off-axis holographic technology is the use of a hologram head-up display to display information on the windshield of an automobile. For example, Nissan Corporation offers as an option a display of speedometer information in the left-hand corner of the windshield. This display is accomplished by an off-axis hologram and is not particularly satisfactory because the hologram is wiped out under certain ambient light conditions, is invisible when viewed through polaroid glasses, and is not conveniently displayed in the driver's line of sight. A system for displaying such a hologram is disclosed in U.S. Pat. No. 4,902,082, incorporated herein by reference.

While holography is of interest with respect to displaying images and information, it is also of interest in communications wherein information is transmitted via fiber optic cables. (See, for example, *Monomode Fiber-Optic Design*, pages 454, 455, incorporated herein by reference.) In order to optically transmit information, it is necessary to multiplex and demultiplex the information as it is fed into and read from a fiber optic bundle. (See, for example, J. Hecht, *Understanding Fiber Optics, Computers and Local Area Networks*, page 371, 1987, incorporated herein by reference.) In accordance with prior art techniques, off-axis holography is utilized. Typical of such techniques is the holographic fiber optic multiplexer, demultiplexer system developed by Ingwall, Kolessinski, and Fielding of the Polaroid Corporation, wherein a photopolymer film, especially developed for infrared light, is used to make a holographic element which simultaneously collects, separates, and focuses light from information-carrying optical fibers. In that the holographic optical element creates separate channels within each fiber, the amount of information carried by a fiber can be dramatically increased. This approach is used to expand telephone service and to provide increased capacity for computer linkage. However, since the holographic signal multiplexer/demultiplexer utilizes an off-axis configuration, difficulties arise in alignment when the holographic element is coupled to an optical fiber. Light must be incident on the core of the fiber and injected into the fiber at an angle relative to the fiber axis that is less than the acceptance angle. Only light within the acceptance cone, formed by rotating a ray at the acceptance angle about the axis of the core, will propagate in the fiber. When one utilizes an object beam which is axially displaced from the reference beam, proper alignment is compromised, resulting in attenuation and dispersion of the signal. This decreases the number of bits of information that can be transmitted over a given fiber in a specified period and thus reduces cable capacity.

Further, with respect to holographic fiber optic multiplexers and demultiplexers, it is difficult to transmit information in both directions when one must deal with optical elements which utilize an object beam which is angularly displaced from a reference beam. This effectively halves the amount of information which can be transmitted.

Multiplexing and demultiplexing of information is not only of significance with respect to fiber optic communications, but is also of interest with respect generally to the processing of information. However, when it is necessary to axially displace the object beam which carries the information from its reference beam, which renders the information intelligible, it is difficult to process information utilizing holographic principles in that coupling holographic elements together becomes exceedingly complex. This complexity is readily apparent when one considers the basic holographic equation (see above), wherein the angles $\alpha$ and $\theta$ must be dealt with. In off-axis holography, the angles $\alpha$ and $\theta$ do not cancel one another, whereas in on-axis holography such cancellation occurs because the object and reference beams are coaxial.

While holography is generally considered to be a phenomenon primarily of interest with respect to the entire electromagnetic spectrum for the display of images utilizing complex light beams or manipulation of optical information utilizing laser beams, many of the same principles which are applicable to visible light are also applicable to other portions of the electromagnetic spectrum such as infrared and ultraviolet radiation, radiowaves, and X-rays. There is a need for a device which extends the optical principles utilized in holography to other manipulations of electromagnetic radiation.

In the past, conical elements have been utilized to manipulate light. For example, devices known as "waxicons" and "axicons" have been explored for optical extraction in lasers (D. Fink, "Polarization Effects of Axicons", *Applied Optics;* Vol. 18, No. 5, pg. 581, 582; Mar. 1, 1979, and J. W. Ogland, "Mirror System for Uniform Beam Transformation in High Power Annular Lasers", *Applied Optics,* Vol. 17, No. 18, pg. 2917, Sep. 15, 1978. However, no suggestion has been made that these devices can be utilized to minimize zero-order problems.

The production of 3-D television systems relying on holography has been explored for years (R. E. Zammit et al., "Compatible Color 3-D TV system: Proposed Design", *Applied Optics,* Vol. 18, No. 5, pg. 584, 585, Mar. 1, 1979). Use of on-axis holography would greatly simplify making 3-D, holographic television a possibility.

SUMMARY OF THE INVENTION

It is an object of the instant invention to provide new and improved methods of and apparatus for manipulating electromagnetic phenomenon to enhance and extend the applications of such phenomenon.

In view of this and other objects, the instant invention contemplates a method of manipulating a beam of electromagnetic energy by directing the energy over at least one conical or pyramidal surface and impinging the energy on a device capable of utilizing the energy in a useful fashion. Moreover, in a broad sense, the instant invention is also directed to at least one conical or pyramidal element arranged and configured to accomplish the purposes of the method.

Upon further study of the specification and appended claims, further objects and advantages of this invention will become apparent to those skilled in the art.

In a more specific aspect, the instant invention contemplates a method of manipulating a beam of electromagnetic energy, wherein the beam is directed over a plurality of axially aligned conical or pyramidal surfaces for impinging on a device for converting the beam into useful purposes. Further in this regard, the instant invention contemplates apparatus for accomplishing the aforedescribed method, wherein the apparatus comprises axially aligned mirrored or (HOE) hologram conical or pyramidal surfaces.

In a specific application of the principles of the instant invention, the instant invention contemplates methods of and apparatus for displaying holograms, wherein axially aligned pyramidal or conical surfaces are aligned with coaxial reference and object beams and with a holographic recording device, such as a holographic plate or the like, so as to display a hologram of the information contained in the object beam.

In accordance with more specific embodiments of the invention, the cones and pyramids are truncated and hollow, with light reflective outside surfaces and light absorbent inside surfaces and with each cone having an open top and an open base. The reference beam is projected toward the truncated ends of the cones in an axial direction through the array and impinges upon a holographic plate coaxially with the object beam containing the information to be displayed.

In a further embodiment of the invention, the reflective surfaces are actual holographic optical elements (HOE's) and, in accordance with other embodiments of the invention, the light-absorbing inner surfaces of the cones absorb electromagnetic radiation of selected frequencies but reflect electromagnetic radiation of other frequencies, wherein a generator is capable of transmitting information in both directions simultaneously.

In another embodiment of the instant invention, the aforedescribed generator provides a method of and apparatus for modulating and demodulating signals transmitted by fiber optic cables, wherein the information-carrying capacity of the cables is increased due to decreases in attenuation and dispersion of the signals.

While in many situations the conical surface is suitable or preferable, there are other applications in which a pyramidal surface of three or more sides is appropriate. In this regard, it should be kept in mind that a perfect cone is merely a pyramid with an infinite number of infinitely small sides so that conical and pyramidal reflective surfaces produce similar results in many situations. In an application where discrete multiplications of an input signal are desired, a surface having a selected number of sides can be used to create a multiple number of identical holograms from a single signal. Also, division of an input signal into a number or series of rings. For example, if one wishes to multiply a signal by an order of magnitude or divide by an order of magnitude since the device is modeled according to a period of 1/n or 1/T, a generator with a pyramidal surface will have ten sides. If it is desired to increase the number of signals by two orders of magnitude, either a pyramidal generator of 100 sides or 10 additional pyramidal generators of 10 sides each, each aligned with a separate hologram of the system, may be utilized. The system can be multiplexed and demultiplexed in accordance with the end results desired.

It is again emphasized that the principles of the instant invention are applicable to the entire electromagnetic spectrum and are not limited to conventional holography or to the visual or near-visual spectra, such as ultraviolet and infrared frequencies or X-rays.

BRIEF DESCRIPTION OF THE DRAWINGS

Various other objects, features, and attendant advantages of the present invention will be more fully appreciated as the same becomes better understood when considered in conjunction with the accompanying drawings, in which like reference characters designate the same or similar parts throughout the several views and wherein:

FIGS. 21A-21C are perspective views of a frusto-conical blank, a pyramidical blank and pyramidical blank which is a polygon in cross-section with a multiplicity of sides;

FIGS. 22A-22C are perspective views of the blanks of FIGS. 21A-21C with grooves therein;

FIGS. 26 and 27 illustrate the results of an experiment not using the generator of the instant invention;

FIGS. 28 and 29A-D illustrate the results of an experiment utilizing the generator of the instant inventions;

FIG. 37 illustrates a reflective surface with a circumferential hologram or grading and the like;

FIG. 53A-53C is a cross-section showing the generator of the instant invention and hologram of the instant invention incorporated into a traffic light;

DETAILED DESCRIPTION

A. General Considerations and Holographic Displays

Figure 1:
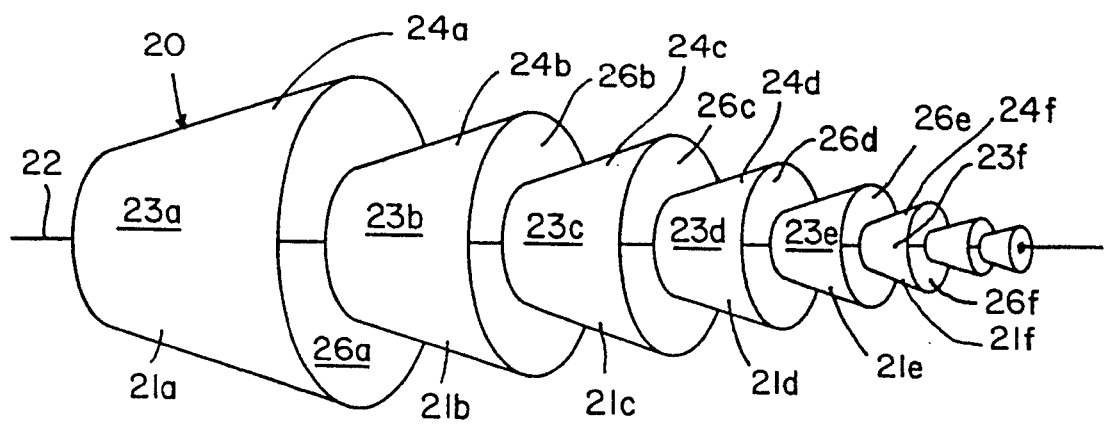
FIG. 1 is a perspective view of a generator according to the instant invention configured as an array of axially aligned, nested, frusto-conical surfaces.
Figure 2:
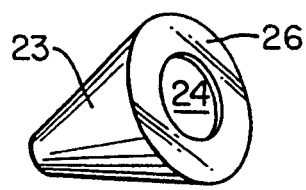
FIG. 2 is a perspective view of one frusto-conical element of the generator of FIG. 1.
Figure 3:
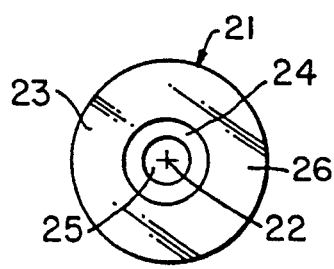
FIG. 3 is a top end view of the frusto-conical element of FIG. 2.

Referring now to FIGS. 1-3, there are shown a generator, designated generally by the numeral 20, configured in accordance with the principles of the instant invention and the elements of the generator. The generator 20 consists of a plurality of nested right cones $21a-21f$ coaxially aligned on axis 22 and overlapping one another. The cones $21a-21f$ each define truncated conical elements having outer conical surfaces $23a-23f$ and inner conical surfaces $24a-24f$. In the illustrated embodiment, the cones $21a-21f$ are held in a rigid array by optically transparent flange struts $26a-26e$, which are fixed to the inner surfaces $24a-24f$ of the outer cones and to the outer surfaces $23a-23b$ of the inner cones. The cones $21a-21f$ each have slightly decreasing areas, with, for example, each cone having a slope of 45° or 22.5°. The cones $21a-21f$ are of decreasing size. In the illustrated embodiment used for head-up displays, each of the outer surfaces $23a-23f$ of each cone is a first-surface mirror in order to reflect light incident thereon, while the inner surfaces $24a-24f$ are black so as to absorb light incident thereon. If it is desired to absorb electromagnetic radiation beyond the upper and lower limits of the visible spectrum, a highly absorbent substance such as melanin can be used to coat the inner surfaces $24a-24f$ of the cones.

Depending on the application, the outer surfaces $23a-23f$ may be first surface mirrors comprised of silver, gold or any other reflective element or compound which will reflect or manipulate light. Moreover, as explained further hereinafter, the conical surfaces may actually be holograms. The flanges or struts $26a-26f$ can be transparent or themselves have optical properties. For example, the flanges $26a-26f$ can be holographic optical elements so that they will assist in deflecting light more efficiently so as to provide an improved device.

Figure 4:
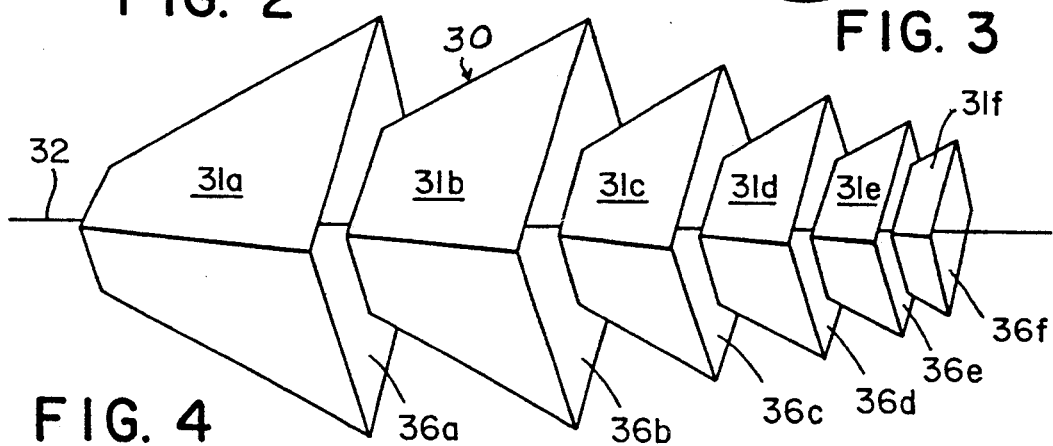
FIG. 4 is a perspective view of a generator according to the instant invention configured as an array of axially aligned, nested, pyramidal surfaces.
Figure 5:
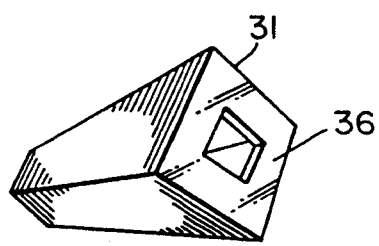
FIG. 5 is a perspective view of a holographic optical element configured as a truncated pyramid used in the array of pyramidal optical elements of FIG. 4.
Figure 6:
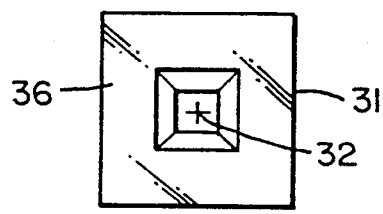
FIG. 6 is a top end view of the optical element of FIG. 5.

Referring now to FIGS. 4-6, there is shown a pyramidal generator, designated generally by the numeral 30, which is similar to the conical generator of FIG. 1, wherein the elements are configured as truncated, hollow, right pyramids $31a-31f$ supported by transparent flanges or struts 36, rather than as truncated hollow cones. The pyramids $31a-31f$ shown each have four sides. However, pyramids $31a-31f$ may have any number of sides. In considering this invention, it should be kept in mind that a cone which is circular in cross-section may be considered to be a pyramid with an infinite number of sides. For some applications and for ease in generating a hologram using current technology, which relies on flat surfaces, a pyramidal generator, such as the generator 30, may be more appropriate. For example, in generating a holographic plate for use with the generator of FIG. 1 a pyramidal generator may be easier to use.

It should be kept in mind that the transparent flange or strut members 26 and 36 can also display optical properties in that they can be a diverging lenses or converging lenses which would speed up the function of the device. This can be accomplished by conventional physical (classical) lenses, collimators, polarizers, etc., or by holographic optics (laser optical) techniques wherein a hologram would be fashioned into a flange or strut and members approximate Beers Exponential Law of Absorption. Therefore, the struts or flanges, along with the actual truncated pyramids, help to diverge the incoming beam or to manipulate it for various applications.

It is to be noted that both the truncated cones $21a-21f$ and the truncated pyramids $31a-31f$ can be of a very small size, on the magnitude of integrated circuit elements fabricated by etching, vapor deposition or other techniques for producing diminutive structures or elements, including photorefractive elements using the index of refraction to bend or reflect light just as with cones and pyramids.

Figure 7:
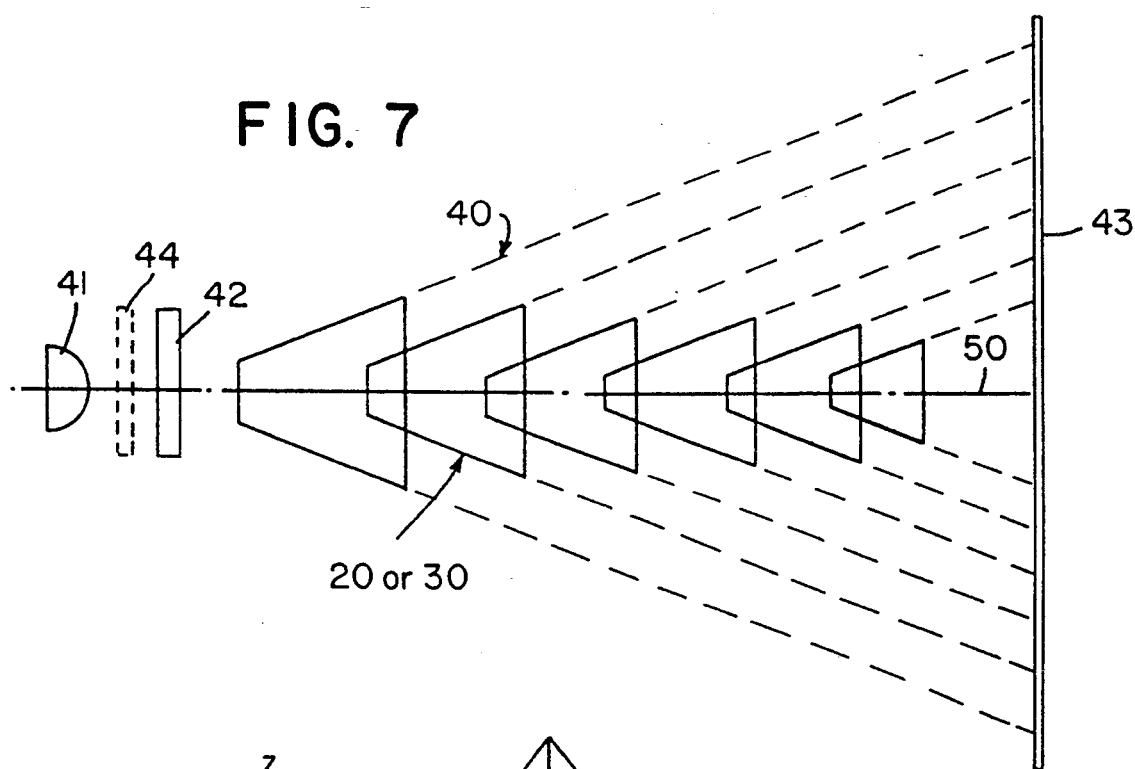
FIG. 7 is an illustration of an embodiment of a system for replaying holograms utilizing the generator of FIGS. 1 or 4, wherein a white light or laser source is utilized.

Referring now to FIG. 7, there is shown a system designated generally by the numeral 40, for displaying a hologram utilizing the principles of the instant invention, wherein either the generator 20 or a generator 30 is placed in axial alignment with a light source 41 and a discriminator ring 42 (optional collimator) to focus the light from the light source onto a holographic film-plate 43 through and over generator 20. The discriminator ring 42 may be a series of conventional relay lenses or holographic optical element type D-rings. The light source 41 may be a white source, such as a cathode ray tube, or a laser light source or any other light source.

The holographic image appearing on the holographic plate 43 is projected by the light source 41, which projects the object beam therefrom. In accordance with one embodiment of the invention, the light source 41 can be a cathode ray tube projecting an image which is displayed on the combiner (HOE) film-plate 43, wherein the holographic plate is actually a mirror known as a combiner.

If the light source is a laser, a beam spreader (dotted line 44) is employed between the laser and the generator 20 or 30. When a laser is used to project an image, a discriminator ring 42 may or may not be utilized.

In both the truncated pyramid and truncated cone approach, the object and reference beams coincide with the axis 50 instead of being angularly displaced with respect to one another, as is the case with conventional holography. By utilizing the series of nested conical (21) or pyramidal (31) surfaces as illustrated, the zero-order is sufficiently suppressed by the time the light arrives at the hologram 43 so as to become a nullity, eliminating difficulties, such as double-holographic images and blurred holographic images or other aberrations.

Figure 8:
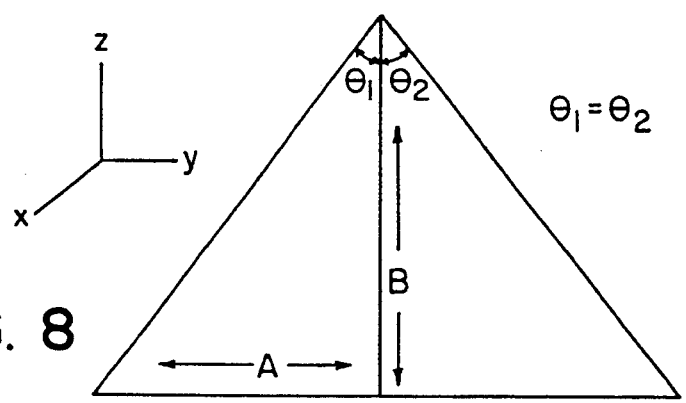
FIG. 8 is a triangle embodying the geometric properties of the cones and pyramids of FIGS. 1-7 and used to illustrate a mathematical explanation of the invention.
Figure 9:
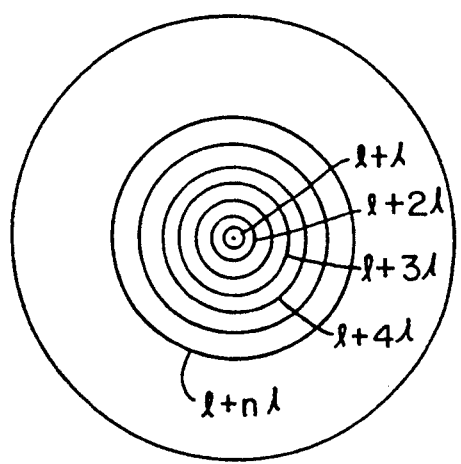
FIG. 9 is an illustration of concentric rings representing Bragg fringes resulting from a theoretical analysis of a holographically-formed zone plate using a conical generator.
Figure 10:
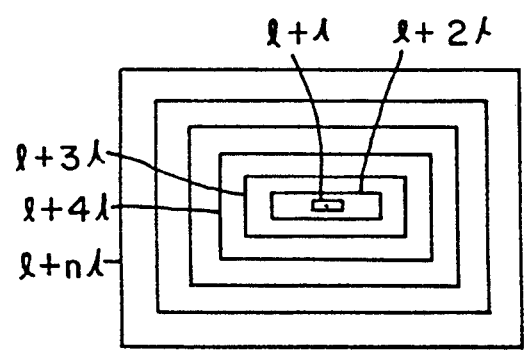
FIG. 10 is an illustration of concentric polygons representing Bragg fringes resulting from using a pyramidal generator.

Referring now mainly to FIGS. 8, 9 and 10, generally, light emanates from a source in a conical configuration with a three-dimensional, convex leading surface. When the superimposed object and reference beams impinge on the holographic plate 43, Bragg interference occurs, since the reference transverse wave is propagated at angle $\Theta_R$, while the modulated object beam is oriented at angle $\Theta_B$. In that the Bragg conditions ($D = \lambda/2 \sin \Theta/2$) for constructive interference and hologram fringe formulation (where $D$ = spacing between multiple fringes throughout the medium; $\lambda$ = wavelength, and $\Theta = (\Theta_R - \Theta_B) = 180°$ can be satisfied.

Referring now to FIG. 8, the reference angle $\Theta_R$ of the transverse wave is related to the $\Theta_1$ or $\Theta_2$ of a right circular cone or pyramid. Hence:

By the relation $\rightarrow B = 2.\theta_2$, or $B = 2.\theta_2$ $\theta\text{Ref} = 2.\theta_1$, or $\theta\text{Ref} = 2.\theta_2$ $\theta_R$ = reference transverse wave $(\theta_R = 2\theta_1); \theta_1 = \theta_2;$ and $\theta_1 = \text{Tan}^{-1} \frac{A}{B}$.

Using the above simple trigonometric identity, multiple conical generator systems can be modelled using A as the radius of the cone and B as its height or A as ½ the base of the pyramid and B as the pyramid's height.

Relying on the following equation:

$$\phi = \text{Tan}^{-1} \frac{A}{B}$$

ps the following values can result for the slopes of the cones 21a–21f (FIG. 1) or for the slopes of the flat sides of pyramids 31a–31f (FIG. 4) with respect to the axes 22 and 32 thereon. In consideration of an 8" hologram plate 10" away from $\theta$max.

For: $A = 4"$ and $B = 10"$ $\theta_{maxa} = \text{Tan}^{-1} \frac{4}{10} = \text{Tan}^{-1} .4 = 21.80°$ (cone 21a)

-continued $\theta_{maxb} = \text{Tan}^{-1} \frac{3}{7.5} = 21.80°$ (cone 21b)

$\theta_{maxc} = \text{Tan}^{-1} \frac{2}{5} = 21.80°$ (cone 21c)

$\theta_{maxd} = \text{Tan}^{-1} \frac{1}{2.5} = 21.80°$ (cone 21d)

$\theta_{maxe} = \text{Tan}^{-1} \frac{0.5}{1.25} = 21.80°$ (cone 21e)

$\theta_{maxf} = \text{Tan}^{-1} \frac{0.25}{0.625} = 21.80°$ (cone 21f)

Therefore:
for a 6-generator arrangement, which is more than needed:
Geometry of each generators elements $\text{Tan} \, \Theta = A/B$

|  | B | Length (Horizontal Lengths) | A | Height (Vertical Lengths) | $\theta_{max}$ |
|---|---|---|---|---|---|
| (Cone 21a) | 2.5" | $B_a$ | 1" | $A_a$ | 21.80° |
| (Cone 21b) | 1.875" | $B_b$ | 0.75" | $A_b$ | 21.80° |
| (Cone 21c) | 1.25" | $B_c$ | 0.5" | $A_c$ | 21.80° |
| (Cone 21d) | 0.625" | $B_d$ | 0.25" | $A_d$ | 21.80° |
| (Cone 21e) | 0.278" | $B_e$ | 0.125" | $A_e$ | 21.80° |
| (Cone 21f) | 0.117" | $B_f$ | .0625" | $A_f$ | 21.80° |
|  | 6.645" |  | 2.6875" |  |  |
|  | 6.645" x |  | 2.6875" y |  |  |

Check solution $\frac{x}{y}$ Tan $\frac{2.6875"}{6.645"} = 22.02°$

Referring now to FIGS. 9 and 10, the Bragg equation for a fringe spacing d is:

$d = \lambda/ \sin (\Theta/2)$ wherein $\Theta$ is equal to the angle between two wave fronts. Therefore, assuming a blue-green wavelength of $\lambda = 500$ nanometers, which is equal to $500 \times 10^9$ meters propagated as laser light at $\Theta = 0°$, the fringe spacings = zero. Hence, ABES relation $d_A = \frac{1}{2}\lambda \sin \gamma_m$ = the resolution limit when one considers that $d_A = \frac{1}{2}\lambda \sin \gamma_m$, when $\gamma_m$ is equal to zero then resolution is equal to zero, therefore $d_A = 0$. Upon considering the zone plate analogy, the system fails at L+10 at center of hologram plate, when L=10 cm or 10 inches. It would, therefore, appear that there is no solution to the problem. However, the generators 20 or 30 solve the problem by creating a light path or bridge to the inner zero center or axes 22 and 32.

Figure 11:
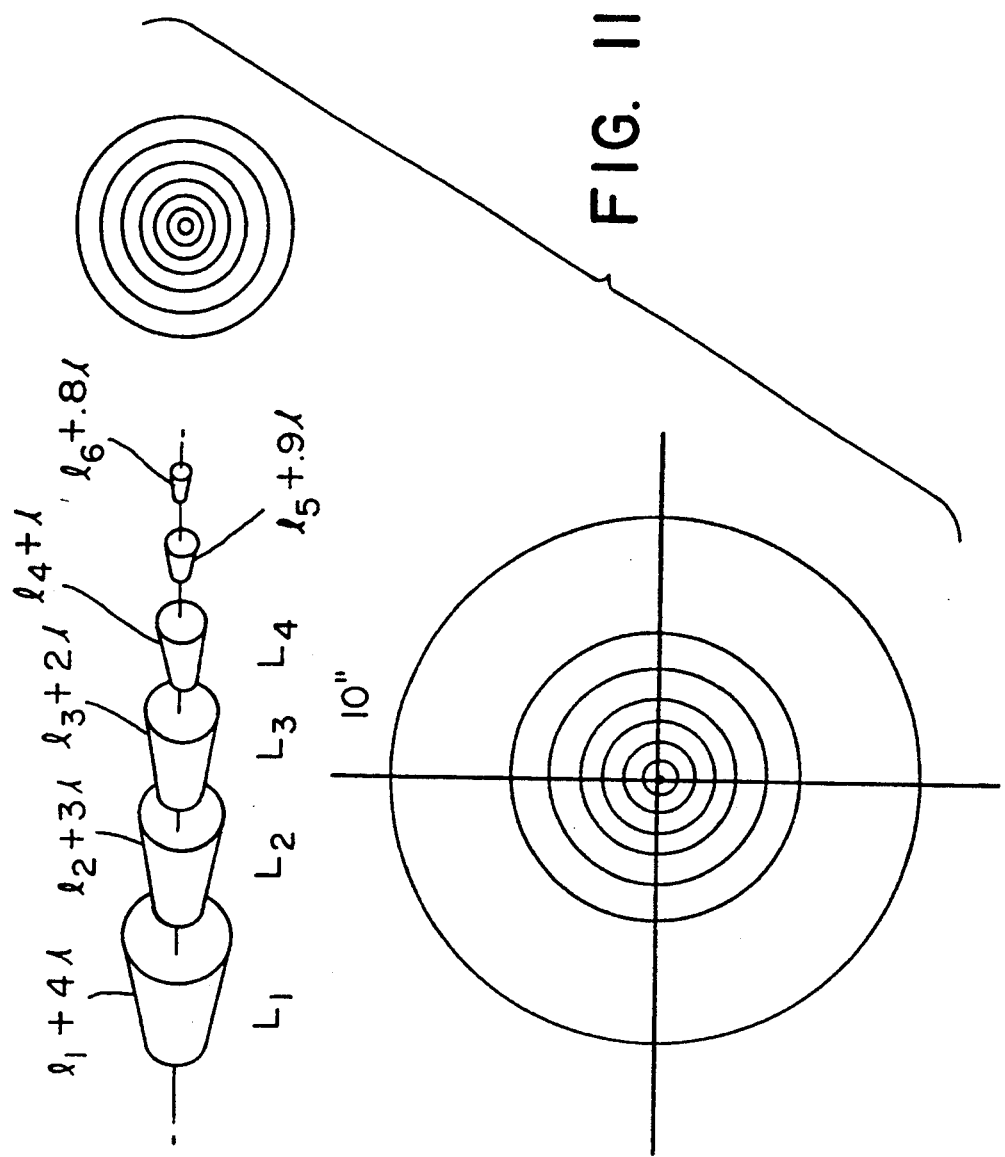
FIG. 11 is a schematic illustration showing the cones of FIGS. 1 and 7 superimposed on a zone plate.
Figure 12A:
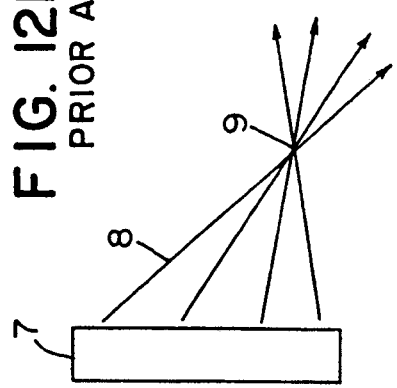
FIGS. 12A-12D are schematic drawings of the prior art approach as exemplified in IBM Technical Disclosure Bulletin 10, No. 3 of August 1967.
Figure 12B:
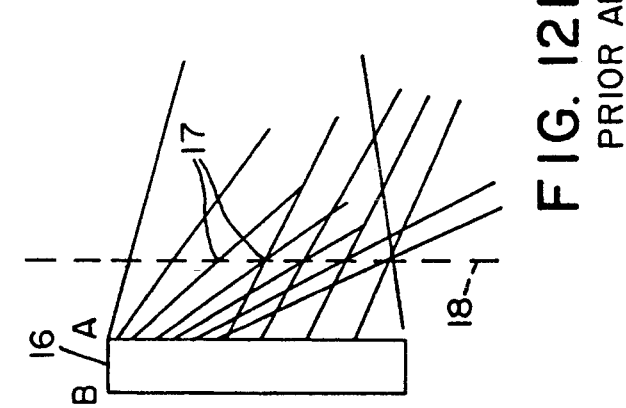
Figure 12C:
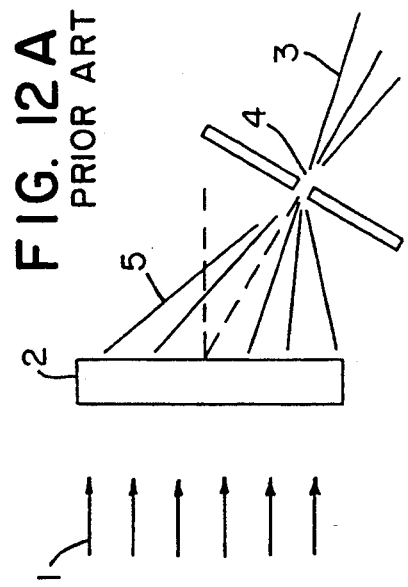
Figure 12D:
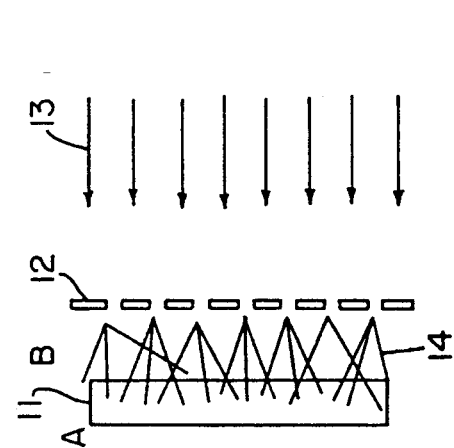

Referring now to FIG. 11, superimposing applicant's generators upon the zone plate, it is seen that wherein L is decreasing in contradiction to the assumed constant, it would make the fringe spacings too wide. However, the total length, L=10 cm or inches, can be broken down into $L_{n1} = 0.1$ cm or $L_{n2} = 0.01$ cm. Correspondingly, a ring would be formed by the action of the generators. This occurs due to the Bragg fringe spacing equation $$d \frac{\lambda}{2\sin \frac{\theta}{2}}$$

or

-continued
$$d = \frac{\lambda}{2\sin\theta}.$$

Given $\lambda$; $\Theta_{genx}=\text{Tan}^1 A/B$ and $\Theta_{Ref}=2x=\theta\text{Ref}=2\cdot\Theta_{genx}$; therefore, $\Theta=\Theta_{ref}+\Theta_{Ref}=2\cdot\Theta_{gen}$.

A further understanding of the instant invention is gleaned from consideration of the prior art considerations set forth in IBM Technical Disclosure Bulletin 10, No. 3, August 1967, incorporated herein by reference, which discloses reference and object beams impinging on a hologram from opposite sides thereof. For purposes of continuity and clarity, the drawings of that Bulletin are included herein as FIGS. 12A–12D "PRIOR ART". In accordance with the instant invention, the reference beam in the IBM Bulletin is replaced by conical or pyramidal generator 20 or 30 with the resulting fringe spacings chosen in accordance with the Bragg equation $$d = \frac{\lambda}{2\sin\frac{\theta}{2}}$$

or $D=\lambda/s\cdot\sin\theta = D=\lambda/2\cdot\sin\theta$ transverse waves having the$\theta$ to produce form of FIG. 9 for conical generators and FIG. 10 for pyramidal generators.

B. Creating the Hologram

Figure 13:
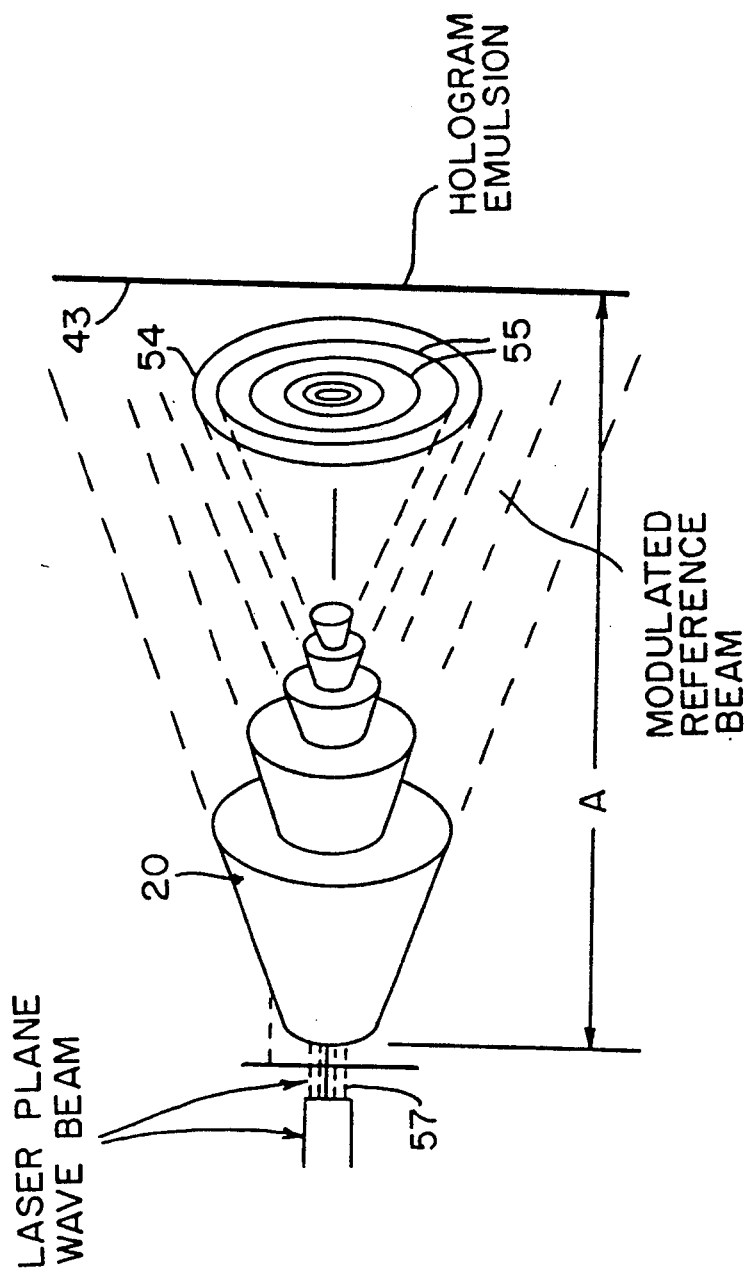
FIG. 13 is a schematic illustration of methods of and apparatus for making holograms utilizing conical generators.
Figure 14:
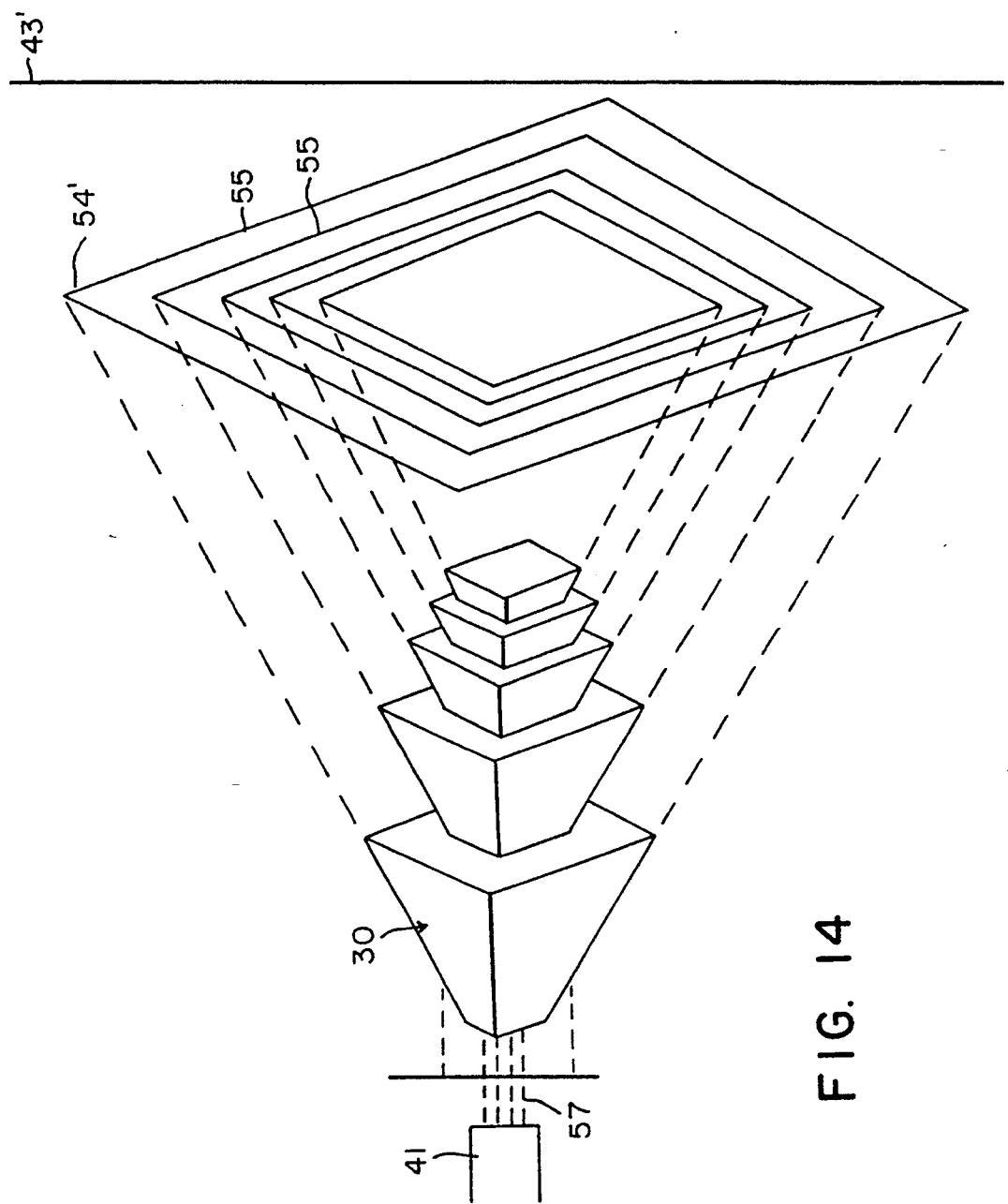
FIG. 14 is a schematic illustration of methods of and apparatus for making holograms utilizing pyramidal generators.

FIG. 13 is an illustration of modulating a reference beam using a conical generator, while FIG. 14 is an illustration modulating a reference beam using a pyramidal generator, with the reference numerals being the same as those of FIGS. 1, 4 and 7, respectively. In FIGS. 13 and 14, the Reference beams 57 are projected onto the hologram 43 and 43'. Again, considering the Bragg equation $$d = \frac{\lambda}{2\sin\frac{\theta}{2}},$$

where $\Theta \sim 45°$.

Figure 15:
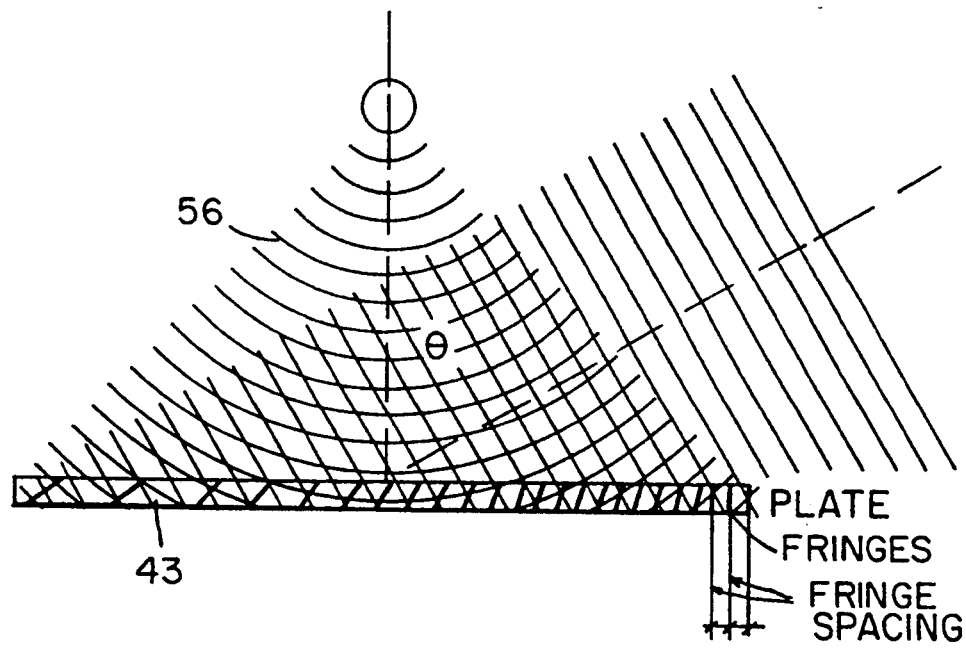
FIG. 15 is a schematic diagram showing fringe spacing which in prior art approaches creates a rainbow effect.

In making the holograms 43 and 43', the size and geometry of the plates or films used for making the hologram must be taken into consideration. As is seen in FIG. 15, the fringe spacings 55 vary across the surface of a given hologram 43 in an off-axis arrangement where the object beam 56 has a spherical wavefront and the reference beam 57 has a planar wavefront, resulting in a rainbow effect or prismatic-type transmission hologram. However, by utilizing the principles of the instant invention as is illustrated in FIGS. 13 and 14, (NOTE: see experiments) the original planar reference beam 57 is modulated into a new transverse wave beam with the fringes 55 and 55' having approximately equal distances.

Considering a specific case where the generators are nested pyramidal generators 30, such as those of FIGS. 4 and 14, if the distance A between the first pyramidal generator element 31a and the holographic plate 43 is equal to one-half the height of the plate (for example, $A=4''$ and $B=\frac{1}{2}\times 8''$ or $4''$ then from FIG. 8, $\text{Tan}\Theta=A/B$ and $$\theta = \text{Tan}^{-1}\frac{A}{B}$$

and $\Theta=45°$). At $\Theta=45°$, $\sin\Theta=\cos\Theta=0.70710$. This is supported by Fourier Series Analysis considerations where $f(x)=$ $$f(x) = \frac{\theta_0}{2} + \sum_{n=1}^{\infty}(c_n) = \frac{\theta_0}{2} + \sum_{n=1}^{\infty}\sqrt{a_n^2 + b_n^2}$$

and $n=0, 1, 2, \ldots 7, \text{¢}$.

The modulated transverse reference beam will impinge on the target plate 43 at $\Theta$. The angle $\Theta$ has been tailored so that $\Theta=45°$ so each rings spacing provides constant fringe spacing according to the Bragg equation.

By having constant fringe spacing, only a particular wavelength should be diffracted, making multicolored transmission images a possibility, resulting in a single color transmission hologram. The method is also appropriate for reflection holograms. The pyramidal and conical generators 20 and 30 can be positioned at various distances from the hologram 43, depending upon focal length consideration and different application, wherein the reference angle $\Theta$ may be equal to $n\cdot\theta$, which may equal $45°$, $30°$, $60°$, etc.

Figure 16:
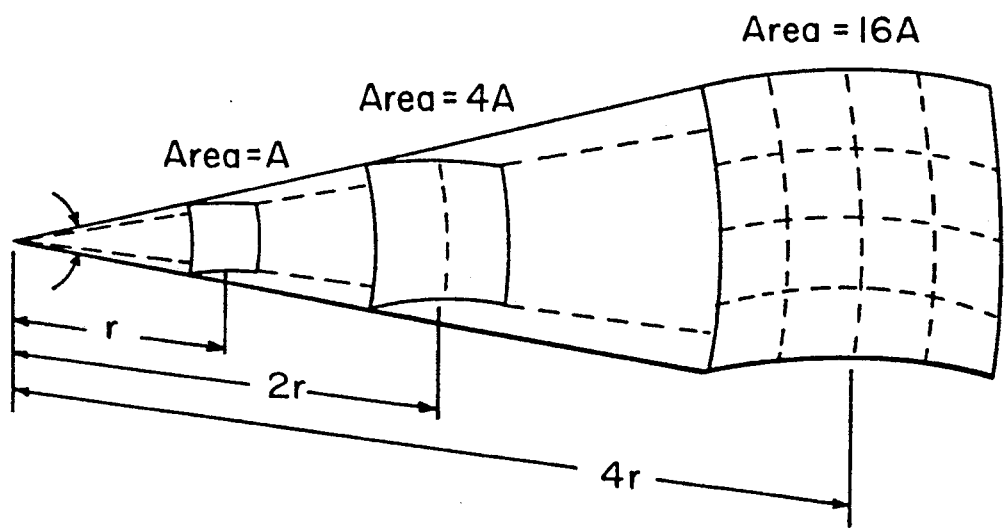
FIG. 16 is a schematic view illustrating the inverse square law.
Figure 17:
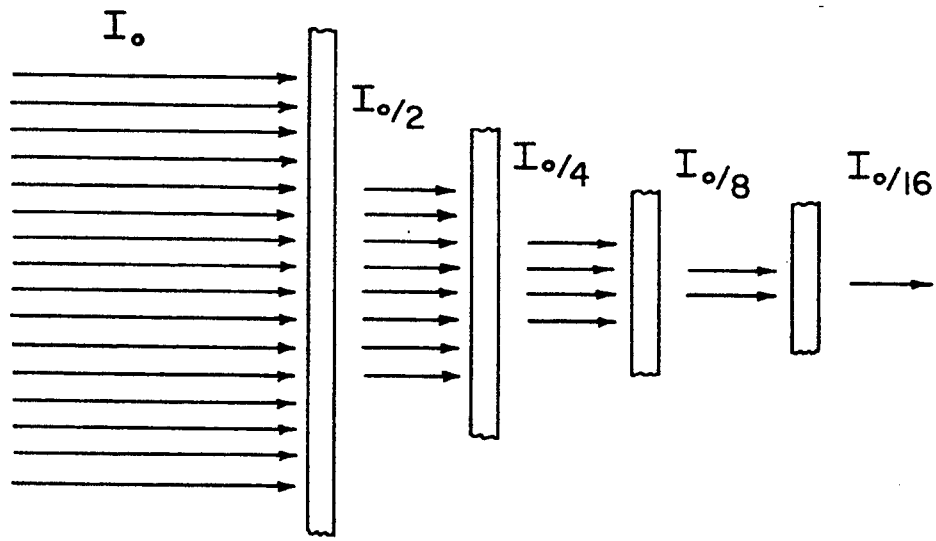
FIG. 17 is a schematic view illustrating Beers law.
Figure 18:
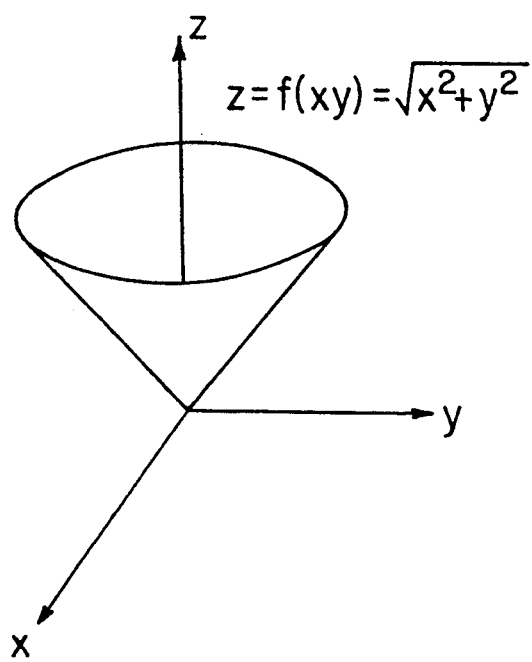
FIG. 18 is a diagrammatical view showing generation of a single cone, the understanding of which relates to an understanding of Fourier Series considerations with respect to the instant invention.

Referring now primarily to FIGS. 16, 17 and 18, there is a relationship among lightwaves, the Inverse Square Law, Beers Law and pyramids and cones. In essence, the relationship concerning lightwaves and general EM radiation is direct in that lightwaves and pyramids have similar properties and structure. One aspect of this phenomenon is that light has an inverse square relationship in that, as the lightwave moves out from a point source, its "intensity is inversely proportional to the square of the distance from the point source. As is seen in FIG. 16, the diverging beam cross-sectional area increases as the square of the distance. Also, this cross-sectional area of light, as it spreads, tends to exhibit a rectangular planar shape which is very similar to the base of the pyramid. Therefore, in reviewing the definition of a pyramid and its characteristics, it is seen that all triangles of a pyramid have a common point or vertex of the pyramid at a distance from the vertex T. The base of the pyramid is analogous to the base of the triangle of FIG. 8. Sections of a pyramid formed by planes parallel to the base are similar to the base frustum, and the areas of the bases are directly proportional to the squares of their distances from the vertex T. This describes exactly the nature of light as it emanates and spreads from a point source or vertex. In further consideration of Beers Law for Light or the Exponential Law of Absorption, it is seen in FIG. 17 that the radiant power diminishes exponentially with distance during transmission through a uniformly absorbing medium. Therefore, knowing that the bothersome zero-order problem is in effect a manifestation of parallel lightwaves travelling almost in a collimated line along the zero-axis, one can solve this problem.

Assuming that light behaves in a spherical or conical fashion as is seen in FIG. 16, the objective is to shunt or eliminate nondiffracted or nondiverging lightwaves. The solution is to use the Inverse Square Law of Light as is seen in FIG. 16 and the diminished inverse effect to remove the zero-order by providing a pyramid 31 or cone 21, preferably a right circular pyramid or cone, which is truncated. The pyramid or cone diverges a large portion of incoming light with a reflecting surface 33 or 23, such as a silver, gold or mirrored hologram surface. A number of additional truncated cones or pyramids are added with each additional cone or pyramid being smaller in reduced area than its predecessor. Additions of cones or pyramids are made to whatever precision is desired for zero-order suppression.

C. Fourier Series Analogy

Figure 19A:
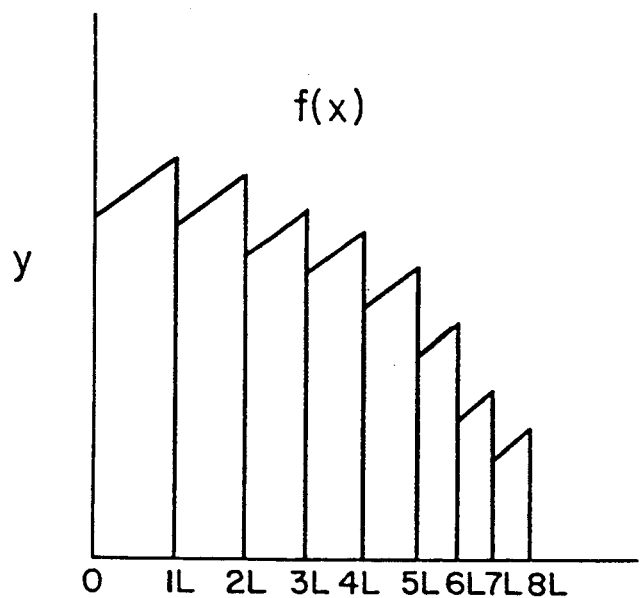
FIGS. 19A and 19B are diagrammatical views of a two-dimensional Fourier Transform.
Figure 19B:
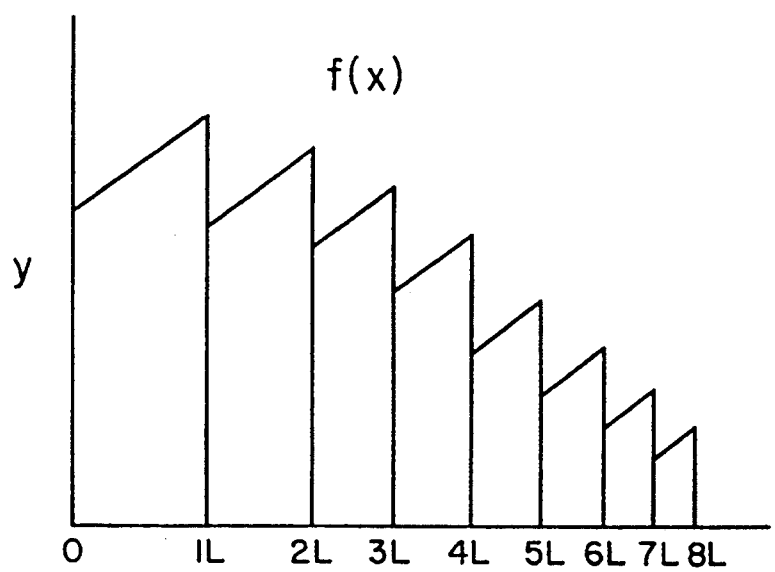
Figure 20:
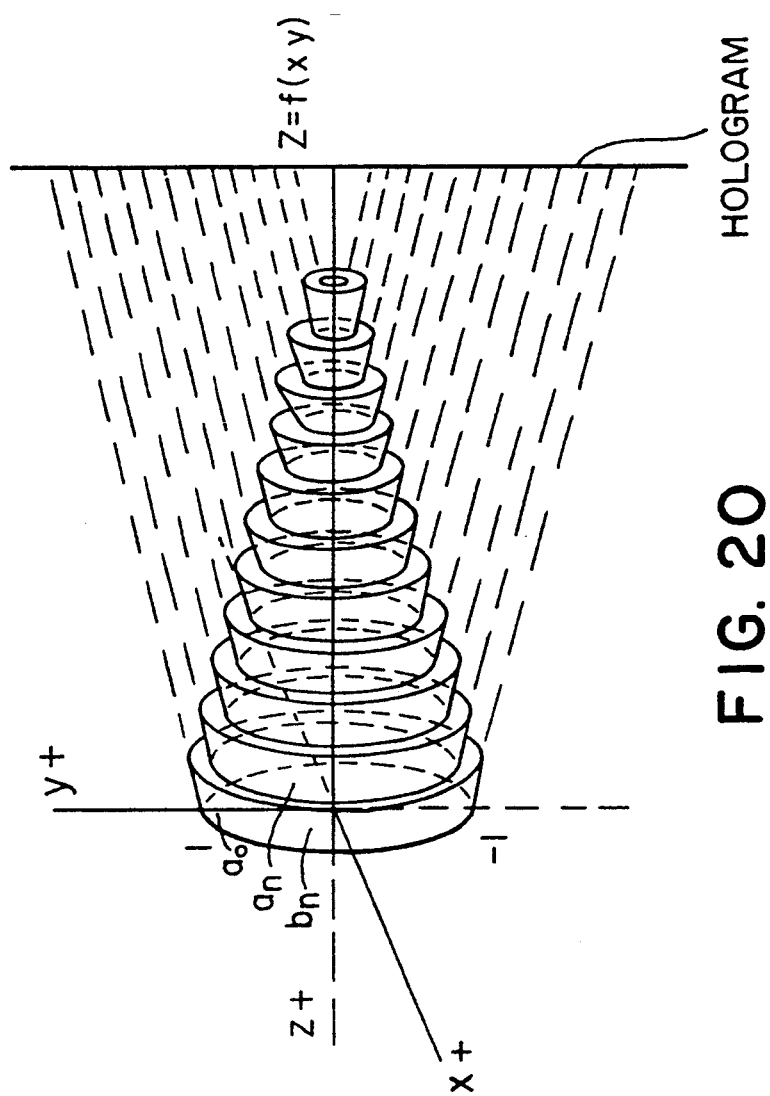
FIG. 20 is a diagrammatical view of a three-dimensional Fourier series approximating the structure of the generators of the instant invention.

Referring now to FIGS. 18, 19 and 20, Fourier Series considerations are directly applicable in designing each unit in that the definition of the Fourier Series is an infinite series of cones which appear to be truncated at the point $a/2°$. The Series is expanded to $$\frac{a_o}{2} + \sum_{n=1}^{\infty} C_n \rightarrow y = f(x) = \frac{a_o}{2} + \sum_{n=1}^{\infty} C_n$$

at $\sin \Theta = \cos \Theta$, $\Theta = 45°$, wherein $C_n = \sqrt{a_n^2 + b_n^2}$ in two variables $y+x$ or two dimensions in three variables $Z = C = f(x,y) = \sqrt{x^2 + y^2}$ which describes a pyramid or cone as seen in FIG. 18 and subsequently a series of cones or pyramids as is seen in FIGS. 19 and 20. In that the truncated cones 21 (FIG. 1) or truncated pyramids 31 (FIG. 4) are attached to each other by circular or square flanges 26 which can be translucent or transparent to allow light to pass through unobstructed, the generators of FIGS. 1 and 4 approximate the Fourier Series geometry of FIGS. 19 and 20.

The conical and pyramidal generators 20 and 30 of the instant invention satisfy the Dirchlet conditions for two-dimensional situations (FIG. 19) and for three-dimensional situations (FIG. 20) in that for any period $f(x)$ is continuous except for a finite number of jump discontinuities (FIG. 19A) and that in any period $f(x)$ has only a finite number of maxima and minima (FIG. 19B). Accordingly, $f(x)$ may be represented by the following Fourier Series:

$$f(x) = \frac{a_o}{2} + \sum_{n=1}^{\infty} \left( a_n \cos \frac{n\pi x}{L} + b_n \sin \frac{n\pi x}{L} \right)$$

wherein $$a_n = \frac{1}{L} \int_{-L}^{L} f(x) \cos \frac{n\pi x}{L} dx, \; n = 0, 1, 2, 3$$

$$b_n = \frac{1}{L} \int_{-L}^{L} f(x) \sin \frac{n\pi x}{L} dx, \; n = 1, 2, 3$$

or $$a_n = \frac{1}{L} \int_{0}^{2L} f(x) \cos \frac{n\pi x}{L} dx, \; n = 0, 1, 2, 3$$

$$b_n = \frac{1}{L} \int_{0}^{2L} f(x) \cos \frac{n\pi x}{L} dx, \; n = 0, 1, 2, 3$$

An example of the Fourier solution appears in FIG. 20 where a zero-order radius of target head-up display is reduced to 0.25". In FIG. 20, $a_o$ equals the minimum point of a first conical or spherical generator which has a base of 2 inches. For purposes of analysis, the positive y-axis is selected, hence one-half the base equals 1 inch. $\Theta$ equals 45° so $\sin\Theta = \cos\Theta = 0.7071$.

In a two-dimensional analysis, $$f(x) = \frac{a_o}{2} + \sum_{n=1}^{\infty} (c_n)$$

or

-continued $$f(x) = \frac{a_o}{2} + \sum_{n=1}^{\infty} \sqrt{a_n^2 + b_n^2}$$

which defines a series of triangles. However, when taken to three dimensions where $z=c$ and $z=f(x,y)$, $z = \sqrt{x^2 + y^2}$, a series of cones or pyramids is defined.

The

Let $\theta \rightarrow \frac{n\pi x}{L}$, $b_n = c \cdot \sin\Theta$ and $a_n = c \cdot \cos\Theta$, then Fourier series is expressed as follows:

$$f(x) = \frac{a_o}{2} + \sum_{n=1}^{\infty} (c \cdot \cos\theta)\left(\cos \frac{n\pi x}{L}\right) + (c \cdot \sin\theta)\left(\sin \frac{n\pi x}{L}\right)$$

or $$f(x) = \frac{a_o}{2} + \sum_{n=1}^{\infty} c \cdot \left( \cos^2 \frac{n\pi x}{L} + \sin^2 \frac{n\pi x}{L} \right)$$

$$\sin^2\theta + \cos^2\theta = 1$$

$$f(x) = \frac{a_o}{2} + \sum_{n=1}^{\infty} c \cdot (1)$$

since $$c_n^2 = a_n^2 + b_n^2$$

$$c_n = \sqrt{a_n^2 + b_n^2}$$

$$f(x) = \frac{a_o}{2} + \sum_{n=1}^{\infty} \sqrt{a_n^2 + b_n^2}$$

$$y = f(x) = \frac{a_o}{2} + \sum_{n=1}^{\infty} \sqrt{a_n^2 + b_n^2}$$

$$z = f(x, y) \rightarrow \frac{a_o}{2} + \sum^{\infty} \sqrt{x^2 + y^2}$$

$$y = f(x, z) \rightarrow \frac{a_o}{2} + \sum^{\infty} \sqrt{x^2 + z^2}$$

For the pyramid/cone generators 20 and 30, the Fourier Series/Fourier Transforms are directly applicable. This is because the very definition of the Fourier Series/Fourier Transforms and the Complex Exponential Fourier Series embody a pyramid/cone or triangle with sides $A+B$ or $y+x$, respectively. The $b_n$ of the Fourier Series can be related to the x-axis and the $a_n$ corresponds to the y-axis.

To design a pyramid/cone generator 20 or 30 to any desired precision required to suppress the zero-order problem in optical holography, one proceeds as follows:

1. A desired phase angle is chosen, for example, $\Theta \rightarrow \theta = 45°$;

2. A desired period is chosen, for example, $L = 1"$, $\frac{1}{2}"$, $\frac{1}{4}"$, etc.;

3. The smaller the selected period L, the greater the reduction in the zero-order and the greater the precision of the device. This contrasts with the previous methods and examples set forth in this application.

In the previous discussion, the periods are large and correspondingly the result is that the nth generator lightwave stops on the target hologram at T±1" or ±½". This is permissible because the nth generators zero line of light is insignificant due to the small size of the nth generator which, in essence, is simulating a very large air space. However, for applications requiring extreme precision, the Fourier Series provides a means to model the pyramid/cone generators to exact specifications.

A rather straightforward approach to making a generator is to configure a simple cone, pyramid or polygonal pyramid with a specific angle in mind, e.g., 30°, 45°. Considering the Fourier series and Fourier analysis for periodic signals, a desired period is then chosen keeping in mind that the Dirchlet conditions are to be satisfied. A desired period length, for example ½", ¼", 1/16", 1/32", 1/64" and so on, is selected, keeping in mind that the smaller the period width or length, the better the resolution. The resulting cone or pyramid has a first surface mirror on both the exterior and the interior surfaces. Thereafter, the cone or pyramid is cut or separated into a plurality of sections. These sections are then assembled into a generator. A similar technique is used for hologram generator sections.

Figure 23C:
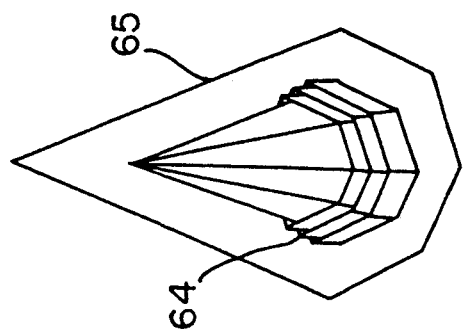
FIGS. 23A-23C are perspective views of conical, pyramidical and polygonal generators formed of stacked elements.
Figure 23B:
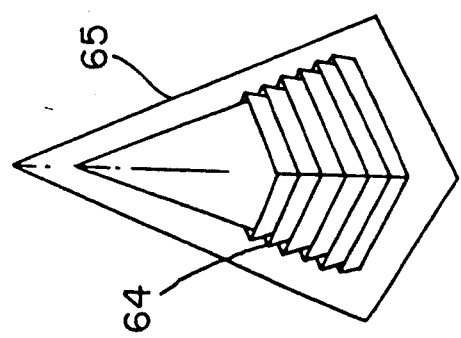
Figure 23A:
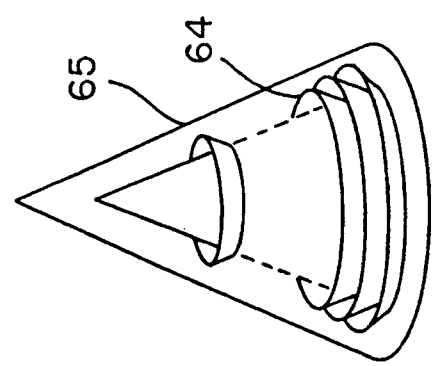

Referring now to FIGS. 21A, B and C, there is shown a transparent cone 60, a transparent pyramid 61 and a transparent pyramid generator 62, with a polygonal (N-sided) cross-section which are used as optical blanks. As is seen in FIG. 22, grooves 63 are formed on the surface of the blanks of FIG. 21 so that ultimately the elements 60, 61 and 62 can hold hundreds of generator cone pyramid sections in place 63 on the blanks. The grooves 63 correspond to the precise level of nesting. For example, if the generator sections are 1/64th inch in width or period and the blank 60, 61 or 62 is 5 inches long, then a total of 320 rings (5×64) or conical polygonal or pyramidal sections can be mounted on a blank. As is seen in FIG. 23, numerous generator sections 64 can be stacked to produce an improved resolution by several orders of magnitude. The capstones can be removed as desired (truncated).

Figure 24C:
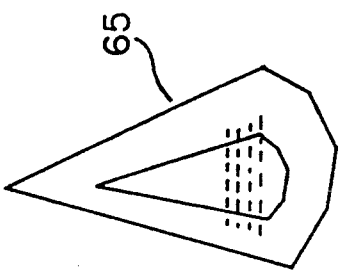
FIGS. 24A-24C are perspective views of conical, pyramidical and polygonal generators with optical covers thereover.
Figure 24B:
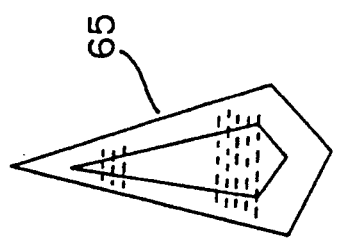
Figure 24A:
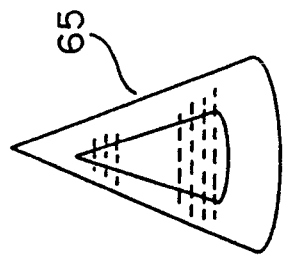

The normal optically clear or transparent conical blanks 60, 61 and 62 can have optical properties that will assist the generator in suppressing zero order light and can be made of plastic acrylic or any type of polymer or substance including optically clear glass. The 60a, 61a, 62a vertices of each element 60, 61 and 62 can be truncated as needed. The generator sections can be made by chemical vapor deposition techniques and/or by photolithographic techniques (including holographic techniques) as are presently employed in the construction of miniaturized electronic circuitry and photorefractive materials (varying the index of refraction). Utilization of these techniques enables hundreds, or even thousands, of generator sections to be deposited upon a blank 60-62. As is seen in FIG. 24, still a further embodiment of this device is shown wherein a conical or pyramidal glass cover 65 is used to assist the device in diffracting nonparallel light at stray angles. The cover can be designed to diffract light itself.

D. The Generator as a Lens

The generator discussed thus far also functions as both a diverging lens and a converging lens. In certain applications, the generator displays properties of a collimating lens in that if light (usually parallel light) is directed at the generator from the side (off axis) then the light will be reflected and collimated in the direction of the largest or first generator conical or pyramidal section.

Any paraxial light wave impinging upon a slanted plane mirror will be reflected generally at twice the angle of the slant angle. This is observed and shown in Leo Beiser, FIG. 4.8, Holographic Scanning, 1988, New York, incorporated herein by reference, where the resultant angle is multiplied by a factor of two. This same relationship is maintained upon each individual conical and pyramidal surface on the exterior of the generator so that if each section of the generator is equal to $\theta°$, wherein, for example $\theta° = 22.5°$, then the total reflected paraxial wave obeys the relationship of $B = 2xa$ wherein $a = 22.5°$. Hence, the output angle is equal to 45°, causing each section to reflect light at 45°. This is also assuming that the original angle of the cones or pyramid array is 45°. Therefore, we are merely considering the half angles as we stack multiple sections to fabricate the generator.

The method of making the generator as a series of holographic optical elements obeys the similar relationship of $B = 2xa$; however, it is noted that in using holography, the object beam angle can be varied in relationship to the reference beam angle so that they differ. In the case of a silver or gold surfaced cone/pyramid, the paraxial reconstruction beam or reference angle and the object beam are related in that the object beam occupies the same angular position as the reference beam and is reflected according to the relationship wherein the reference angle equals twice the cone angle. Therefore, the object beam diverges at an angle that is twice the simple angle of the cone or pyramid. In holography, the relationship of $B = 2xa$ remains under consideration, however, the object beam can diverge at angles different from twice the half cone angle a., as is clearly shown in FIG. 4.8 (a & b) page 64 of Leo Beiser, supra. For a silvered cone or gold cone (any reflective surface for EM waves) the parallel light waves or paraxial waves will impinge upon the generator and be reflected from the generator surfaces according to the relation $b = 2xa$, wherein "b" is the desired reference beam angle and "a" is the half-angle of the pyramid or cone. This relation is well known and conforms to the dihedral relationship of a cone or pyramid reflective surface or slanted mirror assuming "a" is the slant angle. Making a holographic optical element of these cones or surfaces can follow the methods taught by Leo Beiser, supra, pages 63 and 64, incorporated herein by reference. However, in Beiser, the purpose is to develop an optical scanner from a conical or pyramidal surface that is to be rotated at a high RPM to achieve a series of scan lines. The purpose is to have the object beam impinging upon the cone at essentially a 90° angle relative to the surface of the cone, while the reference beam has an angle that is 2 times the angle of the cone. An interesting condition occurs when the cone is at 45° relative to the axis and is illuminated during exposure with a paraxial collimated wave. The conjugate to this is a cylindrical wave derived from a cylindrical lens arriving at all points normal with respect to the axis. There is also an additional valid conjugate occurring in the reverse direction if the cone has a holographic optical element in the interior thereof or in other words, has an HOE on the inside.

With respect to the case of a cone which has a silvered or reflective interior, the converging aspect of the generator is merely the conjugate to the normally diverging exterior surface therefore. In applying holography or making the generator from a series of holographic optical elements these relations are kept in mind. The reference angle "B" and cone angle "a" are chosen so that B=2xa. This allows construction with a simple collimated wave. In essence, these relations can be used in construction of a generator. Also note on page 64, FIG. 4.9 of Beiser that there is shown the relationship of forming a hologram and then using the conjugate or inverse beam to reconstruct the hologram. The simple conjugate is to merely turn the generator around so that its rays are diverging. This is apparent from a simple single beam experiment with a paraxial collimated wave and which is impinged on the generator on axis. The generator makes the collimated wave diverge onto the hologram plate. Upon processing the plate and placing the generator back in the beam exactly the way it was oriented during hologram construction, a series of diverging rings emanating as a real image from the holographic plate with the zero order blocked occurs, resulting in a Gabor hologram without the zero order or virtual image. This solves Dr. Dennis Gabor's, Emith Leith and Dr. Uris Upatneiks' off-axis versus on-axis problem in the field of holography.

During the construction of the on-axis Gabor diverging hologram, the interior of the generator is blackened and the diverging side of the generator is used with a simple paraxial collimated single beam wave. The diverging side is also used to reconstruct the hologram. Therefore, in this special Gabor in-line or on-axis case, the generator is actually self-conjugating.

E. Experimental Confirmations

The aforediscussed aspects of the instant invention were confirmed by experiment in which a hologram was made first without the generator 20 of FIG. 1, then with the generator.

Figure 25:
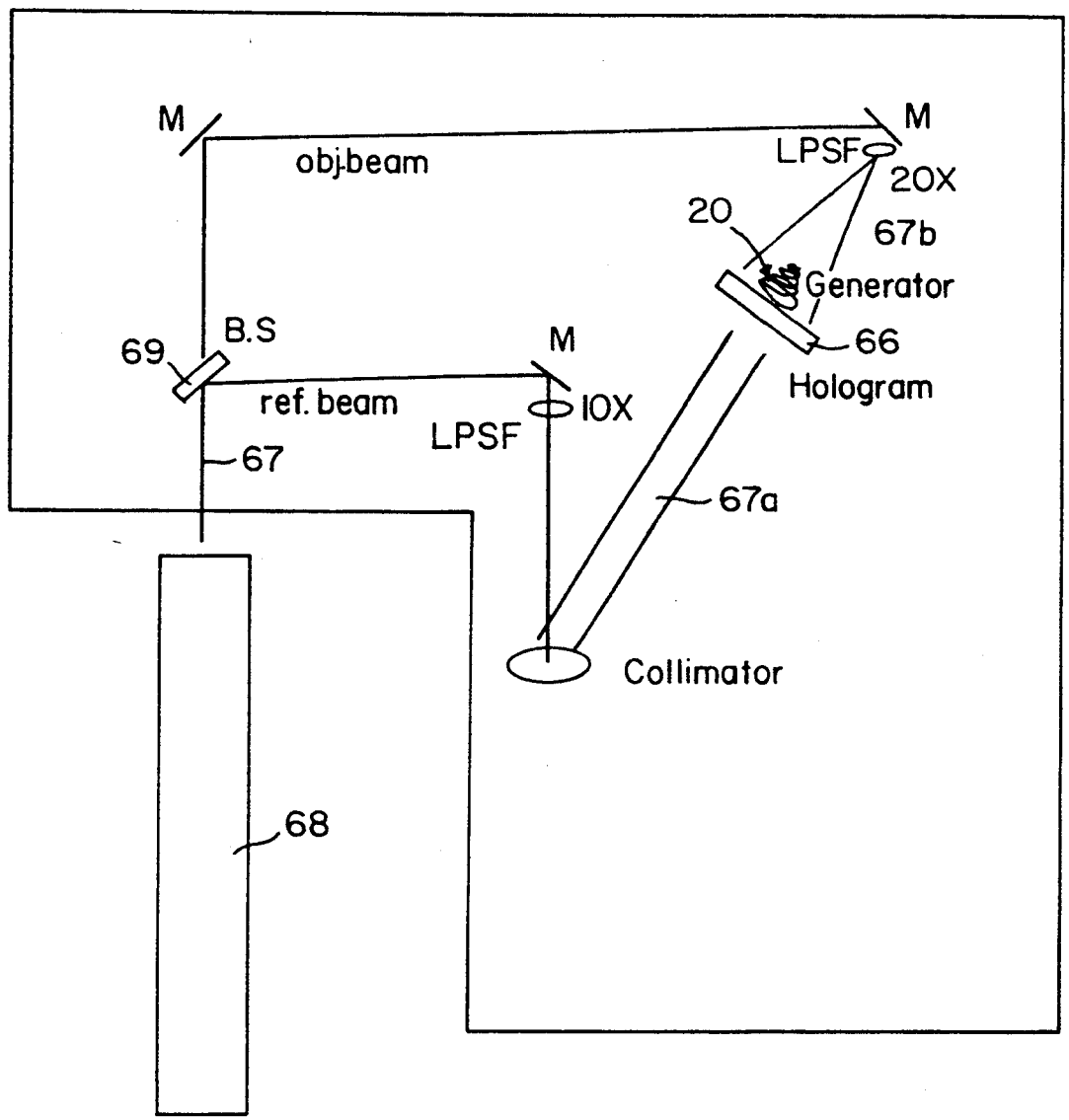
FIG. 25 is a diagrammatical view showing an experiment that establishes the operability of generators configured in accordance with the principle of the instant invention.

Referring now to FIG. 25, there is shown a typical arrangement for creating a hologram in a holographic plate 66 wherein a generator 20 is aligned with the plate to produce a holographic image in an emulsion on the plate. In the experiment, a beam 67 from a laser 68 is split by a beam splitter 69 to form a collimated reference beam 67a and an object beam 67b. The object beam illuminates the generator 20 to form a Bragg diffraction image in the emulsion of plate 66. In the experiment, an exposure ratio of reference beam to object beam of 3 to 1 was used over an exposure time of 0.7 seconds.

With no generator 20 present, an in-line hologram of a point source "P" was created as is seen in FIG. 26, wherein the point source "P" was the focused object beam 67b, and wherein the reference beam 67a was directed onto the back of the plate. As is seen in FIG. 27, on playback with a collimated illumination beam "C", a real image "I" of the point source was produced as expected, but the real image was obscured by the zero-order (non-diffracted) beam.

As is seen in FIG. 28, in creating a hologram in the plate 66 of the point source "P" with the generator 20 present in the collimated reference beam 67a, the point source "P" was again used as the object beam 67b. In FIG. 28, the generator 20 was oriented in a converging mode. Upon playback, as is seen in FIG. 29, with the generator 20 positioned in the collimated illumination beam "C" in a diverging mode, the image "I" of the point source in the hologram in plate 66 appeared as a real image with the zero order beam blacked. Thus, the zero-order problem inherent in in-line Gabor holograms was solved without resort to impinging the reference and object beams at an angle with respect to one another.

Figure 29B:
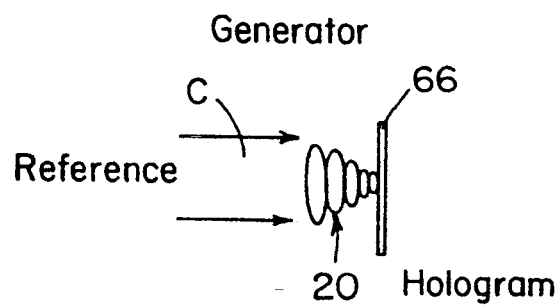
Figure 29C:
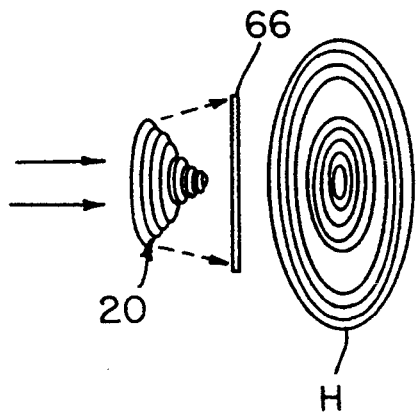
Figure 29D:
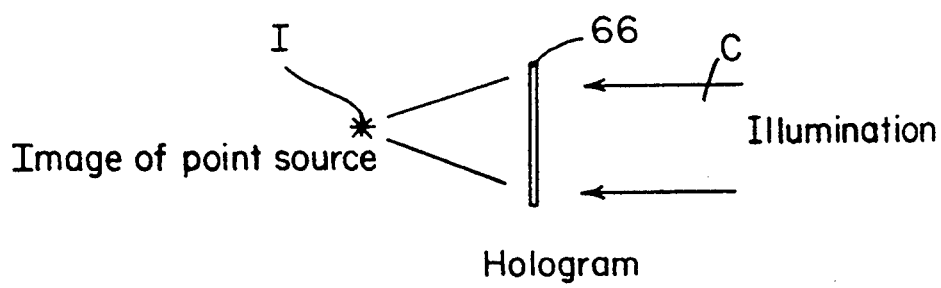
Figure 30:
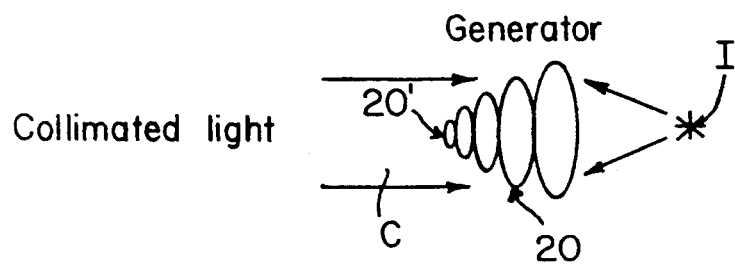
FIGS. 30 and 31 illustrate the results of an experiment establishing that the generator functions as an optical lens and that the generator is actually a three-dimensional manifestation of the Fourier series and is capable of performing a Fourier transform in three dimensions.
Figure 31:
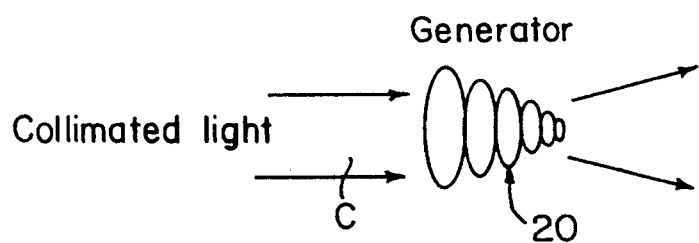

The lens properties of the generator 20 was demonstrated as is seen in FIG. 30, wherein a beam of collimated light C impinges on the narrow end 20' of the generator, the generator caused the light to converge. As is seen in FIG. 31, when the generator 20 is reversed in the collimated beam C, the incoming light diverges. This is consistent with the findings shown in FIGS. 28 and 29, wherein the point source image "I" was indeed reproduced with at least an approximate phase-conjugate beam.

The previous experiments for hologram formation, as described in FIGS. 26, 27, 28, 29A, 30, and 31, are extremely important. However, a most significant experiment involved making a simple Gabor, single beam-type hologram. The construction of this hologram is shown in FIG. 29B. In this experiment, the generator was oriented in the diverging lens mode, and the interior was coated with black paint (to reduce interior reflections). On playback, two very distinct phenomenon occur. First, upon replay, as shown in FIG. 29C, a simple diverging lens appeared as annular rings emanating as a real image from the hologram. The generator is also in the same diverging position as shown in FIG. 29B, with the interior blackened. This contrasts sharply with the experiments described in FIGS. 26-31, wherein the interior of the generator was not blackened. This demonstrates that the converging aspects of the lens and its conjugate can be used to make holes. Secondly, when the generator is removed on playback, as shown in FIG. 29D, the conjugate to the diverging mode of the generator, as well as a focusing of paraxial collimated light results. In addition, sufficient zero order blocking is demonstrated by the hologram itself. In the experiment, an 11-ring generator was employed. Therefore, in consideration of the zone plate analogy, as demonstrated in FIGS. 9, 10, and 11, and further embodiments of this invention, if the period T is made smaller, a ring density of 50, 100, 300, 1000, and so on is achieved. Complete elimination of the zero order by the hologram itself is possible, and the generator is not needed during replay of the hologram. This experiment shows that the principles of the instant invention can be used to make lenses for eyeglasses or contact lenses.

F. Binary Optics Applications

The refractive or light bending properties of the conical pyramidal/polygonal section surfaces on both the interior and on the exterior surfaces in both the reflection and transmission modes can be enhanced using binary optics techniques. In addition, one may employ both the normal refractive properties of a glass or plastic lens and the properties of a diffractive lens, including diffractive components such as holographic optical elements. Such combinations solve numerous problems associated with normal refractive lenses. Essentially, refractive lenses bend light comprised of different wavelengths, such as white light, causing some wavelengths to bend more than others. For example, red light will focus at a different point than blue. However, binary optics techniques add a notched diffractive component to the refractive lens so that chromatic aberration is corrected. This results in all wavelengths of the light being combined at a point or focus. The generator 20, according to the instant invention, behaves as a refractive lens when silvered or overlaid with a first surface mirror of silver or gold. The generator 20 is in essence a diverging lens and a converging lens. When using silver or gold, the generator uses refraction, however, in some instances, it displays chromatic aberration which can be corrected or lessened by optical methods. However, holograms are diffractive elements and generally break light up by sharp edges and narrow apertures. Therefore, on a reflective generator's exterior section surfaces and on its interior surfaces (converging side), diffraction patterns can be carved which are in essence a plethora of tiny staircase-type notches. Accordingly, as more generator sections are added, the resolution of the image improves and the combination of binary optics with a generator-lens can dramatically improve its lens properties. Photolithographic and chemical vapor deposition techniques which are known to those skilled in the art can be used in the fabrication of the generators wherein literally thousands (or more) generator sections can be configured on a generator. Moreover, if a binary approach is applied to the generators, the natural zero order eliminating properties, as well as the generators diverging and converging properties, will be enhanced.

When the interior surface of the conical generator is reflective, it displays the unique properties of a converging lens if exposed to a paraxial collimated wave of light in that it will cause light rays comprising the wave to converge to a point. The focal length of the device is a function of the generator length and cone/pyramid angles. In some cases, the generators display the well known problem of chromatic aberration. Chromatic aberration can be lessened by employing conventional chromatic aberration techniques including increasing the nesting density of the generators, employing fabrication techniques including binary optics and utilizing similar holographic techniques. Incoming collimated paraxial light converges to a focus after being channeled through the interior of the generator. This mode of the generator is merely the inverse or conjugate of the mode in which light rays diverge from the exterior surface of the generator. (See FIGS. 30 and 31 and the discussion.)

G. General Considerations in Making the Generator

As long as the steps of making a generator are designed with the constraints of the Fourier series concepts, including obedience to the Dirchlet conditions, and the period is made smaller and smaller, the resolution will improve. It is possible to take a cone/pyramid, silvered or golden or having any reflective type surface for any portion of the EM spectrum, including UV, IR and X-rays, and according to the Dirchlet conditions choose a desired period, e.g., $\frac{1}{4}$; $\frac{1}{8}$; 1/6; 1/32; 1/64; 1/128; 1/256 or 1/n and so on. This first relation is merely a series $\frac{1}{2}^n$ which is synonymous to the $2^n$ used in the binary system for modern computers. The cone/pyramid is then separated into a series of sections and then reassembled according to the previously stated methods of fabrication of a generator. The number of rings can be calculated using the relation $R = \text{length}/y_n$ or $R = \text{length}/\frac{1}{2}n$, $L = $ desired length of the generator.

G. Mathematical Justification for Hologram Formation and Bragg Fringe Formation

Essentially the formation of holograms, especially a holographic optical element, requires that the fringe spacings to be laid down according to the formula $D = n\lambda/2 \sin a$. This is true generally for hologram formation as well as X-ray crystallography analysis. The generator technology of the instant invention achieves fringe formation in a unique fashion. A basic property of any triangle is that its area is equal to $A = \frac{1}{2} b \times h$, where b equals the length of its base and h equals to its height. Referring back to FIG. 8, the angular relationship is $\tan\theta = A/B$ or $\sin\theta/\cos\theta = A/B$. The ability of the generator to achieve fringe formation is due to triangular relationship of $\sin\theta/\cos\theta = A/B$, otherwise fringe formation occurs in holography according to the bragg relationship $D = /\lambda 2\sin\theta$, wherein D is equal to fringe distance spacing, the new relationship is arrived at as follows:

Let the angular relationship of the generator be:

$$\text{Tan}\theta = \frac{\sin\theta}{\cos\theta} = \frac{A}{B}$$

$$\text{Bragg equation} \rightarrow D = \frac{n\lambda}{2\sin\frac{\theta}{2}}$$

or $$D = \frac{n\lambda}{2\sin\theta}$$

$\sin\theta = \cos\theta \times A/B$. As derived from $\tan\theta = \frac{\sin\theta}{\cos\theta} = A/B$ However, upon substituting $\cos\theta \cdot A/B$ for $\sin\theta$, where n=1, 2 ... the result is $$D = \frac{n \cdot \lambda}{2 \cdot \cos\theta(A/B)}$$

Therefore, normally at $\theta = 0°$, $\sin\phi$ equals O and D is undefined, yet at $\theta = 0$ for $\cos\phi = \cos 0°$, we have a maximum for fringe formation and spacing.

H. Multiplexing and Demultiplexing In Optical Fiber Systems

Multiplexers permit more than one signal to be transmitted on a single optical fiber. Up until recently, almost all multiplexers have operated electronically. There are two basic types of multiplexing: time division multiplexing, in which signals from several sources share the circuit by using the circuit in successive time slots, and frequency division multiplexing, in which the available transmission frequency range is divided into narrower bands, each of which is used as a separate channel. In optical transmission, combined signals from the multiplexers are converted to an optical signal and transmitted over the fiber. At the other end, a complementary process (demultiplexing) breaks down the multiplexed transmissions into their constituent signals. However, even when carried by lightwave systems, such multiplexing requires electronic devices.

A more recent development in optical communications is wavelength division multiplexing (WDM), which allows the combination of signals at high speeds through the multiplexing of optical beams of different wavelengths. Because light beam of different wavelengths propagate without interfering with one another, several channels of information can be transmitted over a single optical fiber, increasing its information carrying capacity, or bandwidth.

In consideration of tile following, it is considered as an explanation of why a generator operates as it does. However, the key to the following is to keep in mind that the converging and diverging properties of the generator make forward and reverse transmission possible. Also, in practice, the cone or pyramide angles can be $45°/2 = 22.5°$ since $B = 2 \cdot \alpha$ or $\theta_{Ref} = 2 \cdot \theta_{gen}$.

Fiber optic connectors represent the physical interfaces for a fiber optic system and are used to connect and interconnect the various components of long distance, local area network, data, industrial, medical and military fiber optic systems. Connectors may be designed in a variety of ways to fit particular situations but all are used to complete connections by mating two fiber terminations in some form of housing. Connectors are a critical component of a fiber optic system since any attenuation or losses occurring at connection points in the system lessen the effectiveness of the total system.

Figure 32:
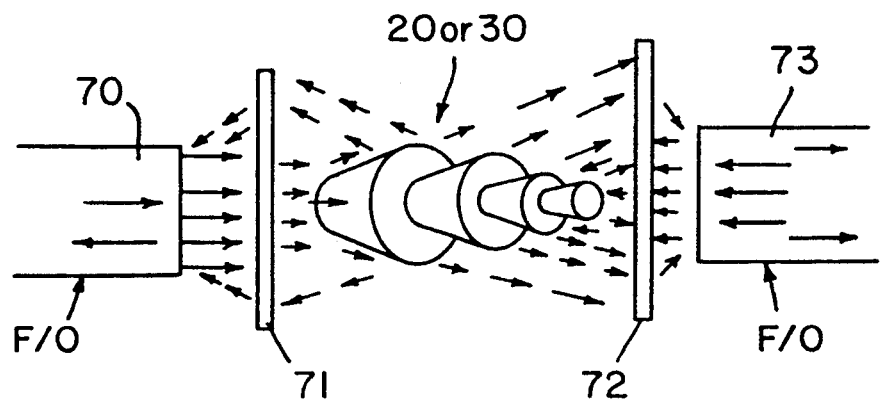
FIG. 32 is a diagrammatical view illustrating an optical coupler utilizing the principles of the instant invention.

As is seen in FIG. 32, a fiber optic element 70 passes an optical signal through a holographic optical element made into a D-ring 71, which is in alignment with the generator 20 or 30. The generator 20 or 30 directs the image through a second holographic optical element D-ring 72 and into a fiber optic line 73 to connect fiber optic line 73 to fiber optic line 70. The generator in FIG. 32 can also be made using photoretractive materials.

With the arrangement of FIG. 32, information can be simultaneously transmitted in both directions with signals passing in one direction over the outside surfaces of the cones or pyramids 20 or 30 and in the other direction over the inside surfaces of the cones or pyramids. This embodiment shows a transmission mode of the cones or pyramids and reflection mode. The apparatus of FIG. 32 is capable of tw-way transmission wherein signals can both be sent and received simultaneously.

Figure 33:
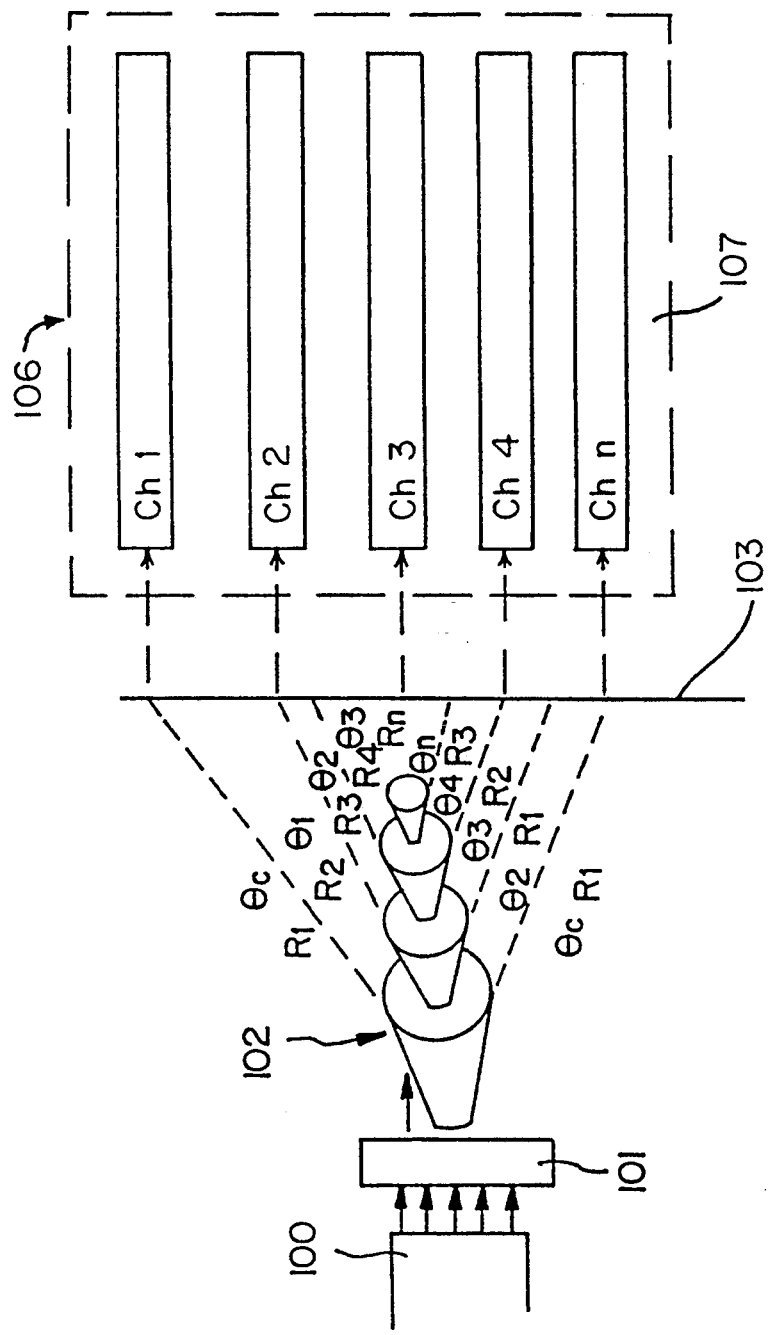
FIG. 33 is a schematic view showing the instant invention being utilized in a demultiplexing system utilizing a planar hologram.

Referring now to FIG. 33, there is shown a fiber optic element 100 aligned with a D-ring 101 or relay lenses and a pyramidal or conical generator 102 which impinges information from the cable onto a hologram 103. The hologram 103 is a demultiplexing hologram or series of holograms which accept a particular reference beam angle and transmits images to selected channels, designated generally by the numeral 106, of a receiver 107. The receiver 107 can be any type of optical receiver which utilizes signals for a selected purpose, such as telephone switching, computer interfaces, or the like.

Figure 35:
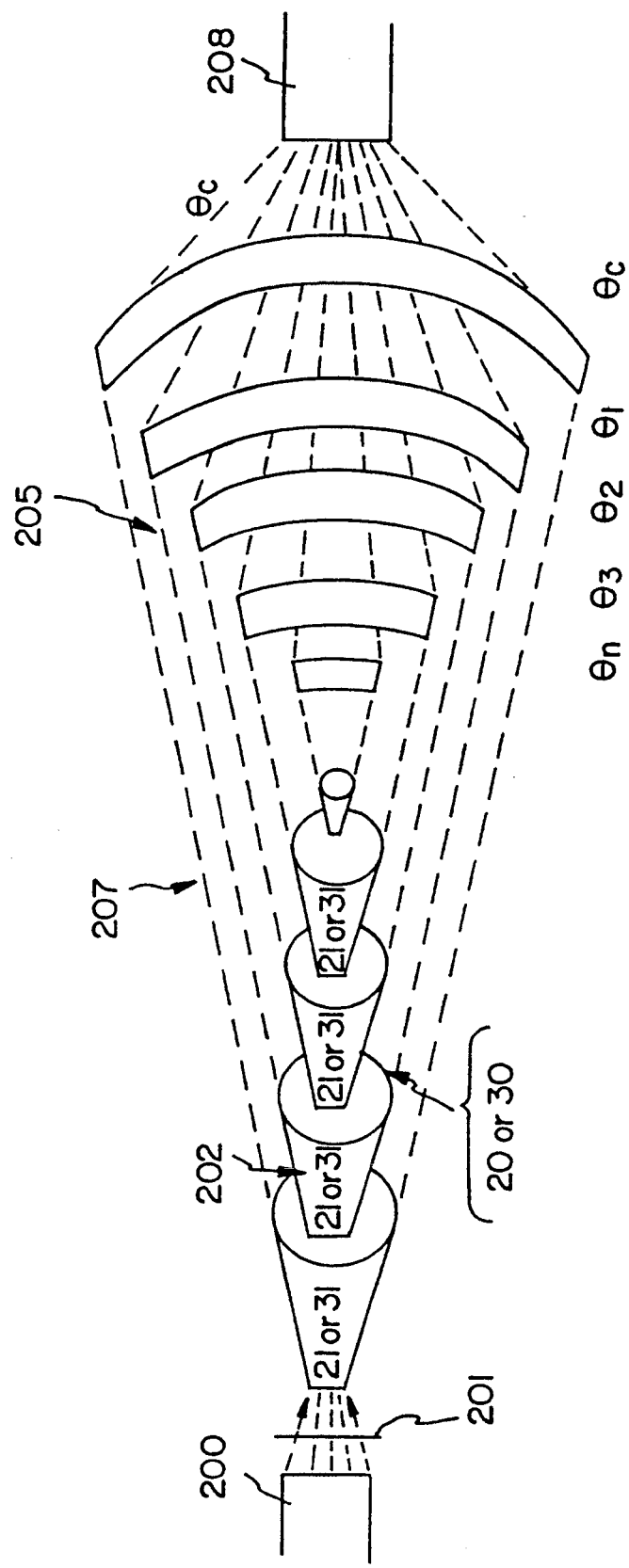
FIG. 35 is a diagrammatical view showing a cylindrical acceptor with cylindrical or spherical sections.
Figure 36:
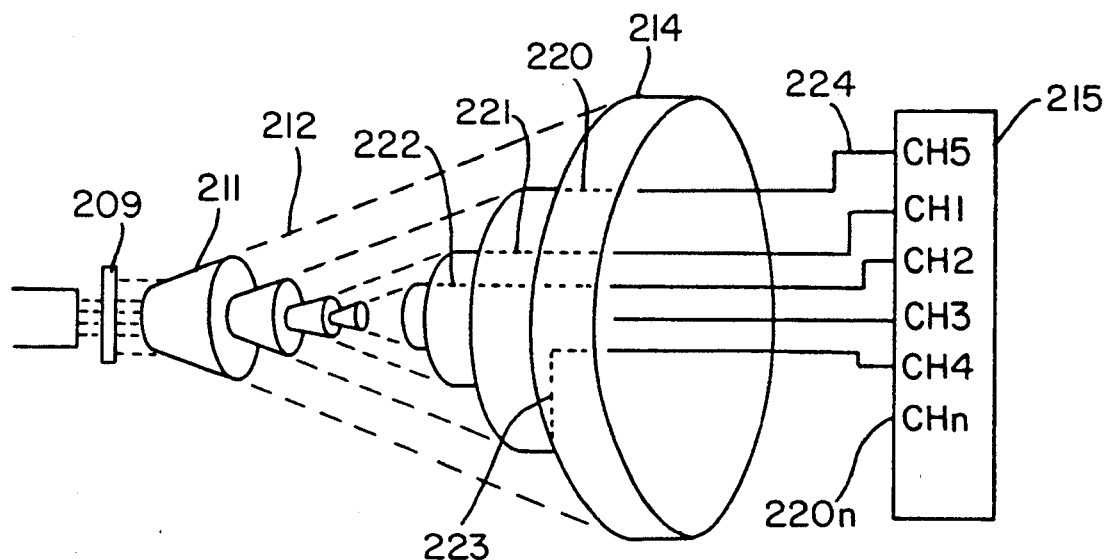
FIG. 36 schematically illustrates a receiver for optical signals from the conical or pyramidal generators of the instant invention wherein an array of transmitting fibers are connected thereto.
Figure 37:
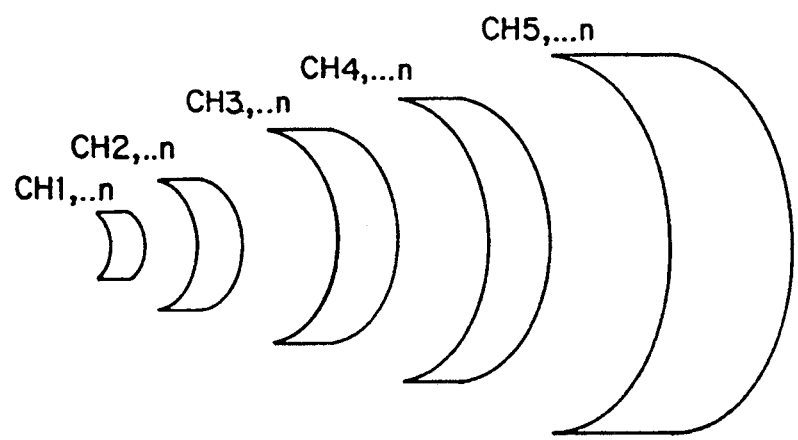

The cylindrical optical elements, as shown in FIGS. 35, 36, and 37, may have a first surface internal mirror in order to be highly efficient. For example, if visible light is being transmitted, then it should have a silver first surface mirror and if infrared information is transferred, then the inner surface should be gold. The inner surface of the cylinder can also be configured as a reflective hologram having a reference beam and a corresponding object beam with its own angle. If the mirror is a hologram, then the pyramid/cone generators $\Theta_c$, $\Theta_1$, $\Theta_2$, $\Theta_3$ ... $\Theta_n$ matches the reference angle holograms or holographic optical elements which are mirrors being single-channeled or multi-channeled. Consider the relation $\beta = 2xa + \Theta_{Ref} = 2\Theta_{gen}$. Alternatively, surfaces forming the holograms can be a series of concentric bands each having a section of a hologram mirror, lens, prism or general optical element for focusing light from the pyramid/cone generator onto a receiver fiber optic cable system.

The arrangement can also serve as a transmitter for an angular division multiplexer or demultiplexer device which solves the problem set forth in the book MONOMODE Fiber-Optic Design with Local Area and Long Haul Network Applications, Donald G. Baker, 1987, pp. 455 and 456. As is seen in this book, there is no practical way of transmitting and receiving ADM, FDM and WDM signals together (simultaneously) in a fiber optics system. By utilizing the principles of the instant invention, one is able to both transmit and receive such signals.

The following discussion relates to configuring the conical and pyramidal elements shown in the apparatus of FIGS. 33-37 so as to accomplish angular division multiplexing (ADM), wavelength division multiplexing (WDM), frequency division multiplexing (FDM) and time division multiplexing (TDM). This is accomplished by designing the hologram (either cylindrical or planar) with the selected multiplexing properties.

Angular division multiplexing (ADM) is possible because $\Theta_{gen}$=the angle of the pyramid or cone and $$\theta = \text{Tan}^{-1}\frac{A}{B}$$

when the hologram cuts on and reconstructs at $\Theta_{ref}$ which equals one-half the reference beam angle and $\Theta_{red} = 2 \text{x} \Theta_{gen}$. To accomplish this, one designs $\Theta_{ref}$ to equal two times the $\Theta$ of the generator. There may be a number of $\Theta$ generators so we have the following situation:

$\Theta_{ref1}$, $\Theta_{ref2}$, $\Theta_{ref3}$, $\Theta_{ref4}$=2x ($\Theta_{gen1}$, $\Theta_{gen2}$, $\Theta_{gen3}$, $\Theta_{gen4}$)=2$\theta_{gen}$, 2$\theta_{gen2}$, 2$\theta_{gen3}$, 2$\theta_{gen4}$ or B=2d; $\theta_{Ref}=2\cdot\theta_{gen}$.

Wavelength division multiplexing or demultiplexing (WDM) is accomplished by designing the hologram optical element to separate or focus any source of light into its constituting wavelengths or members in the same way that a prism separates colors of different wavelengths or frequencies, which is, in essence, frequency division multiplexing. Frequency division multiplexing is obvious from the formula $c = \lambda \rho$, where c is the speed of light, $\lambda$ is the wavelength of light and $\rho$ is the frequency.

Figure 42:
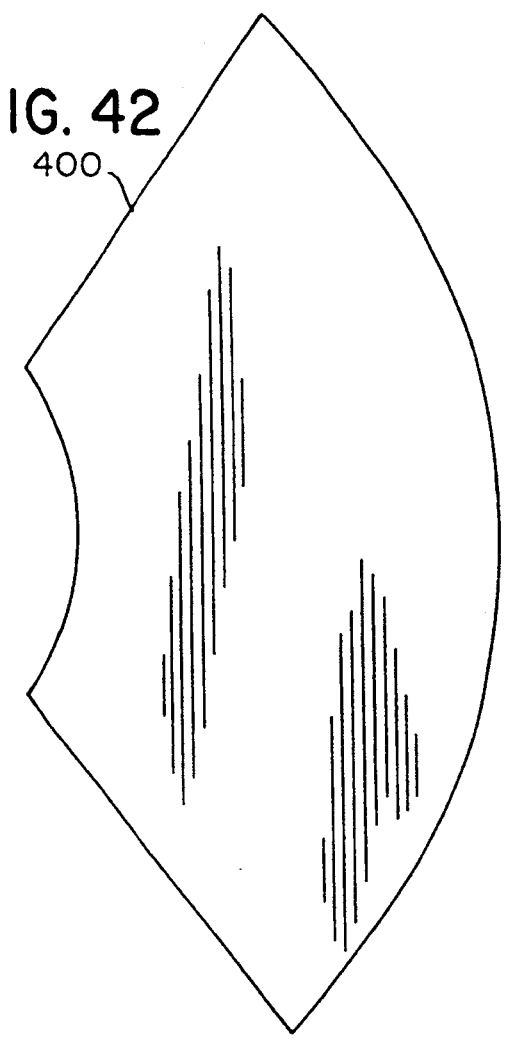
FIG. 42 is a planar view of a planar hologram prior to rolling the hologram into a cone or pyramid.

In practice, the same wavelength can be used for frequency division multiplexing. While the optical relay 108 in one embodiment has a continuous interior reflective surface, it is also possible to have an interior grating as is seen in FIG. 42, wherein the surface is divided into a plurality of reflective areas $R_1$-$R_n$. The interior surface may be a hologram and the exterior surface can be opaque or translucent. For ADM, WDM, FDM and TDM applications different sections of the grating can have various characteristics. For example, the area $R_1$ can be a reflection hologram having prismatic properties.

Referring now to FIG. 35, there is shown a system for transmitter multiplexing wherein a fiber optic element 200 passes its signals through a D-ring 201 or a series of relay lenses and through a conical generator 202 which focuses the beam through a cylindrical acceptor 205 with spherical interior surfaces which serves as a relay mirror. The interior of the cylindrical sections or spherical sections may be in the form of a first surface mirror which reflects the beams 207 onto a fiber optic element 208.

Referring now to FIG. 36, there is shown a receiver in which the fiber optic elements of a multiplex circuit direct a beam through a D-ring 209 or relay lenses and onto a generator 211 having conical or pyramidal surfaces which generator 211 directs the lightwaves 212 through the interior surfaces of relay cylinders 214 for transmission to pigtails and receiver 215. The exterior surface of the relay cylinder may be opaque with the exterior surfaces supported on the interior surfaces by transparent struts which allow light to pass. An array of optical transmitting fibers, or the like, 220, 221, 222i 223, 224 and 220n pick up the signals from the interior of the elements comprising the light relay 212 and transmit the signals to the channels in the receiver 215. As with the cones and pyramids, the reflective surfaces of the hollow cylinders or spherical elements may be arranged with axially extending holograms or with circumferential holograms as is seen in FIGS. 36 and 37.

Figure 38:
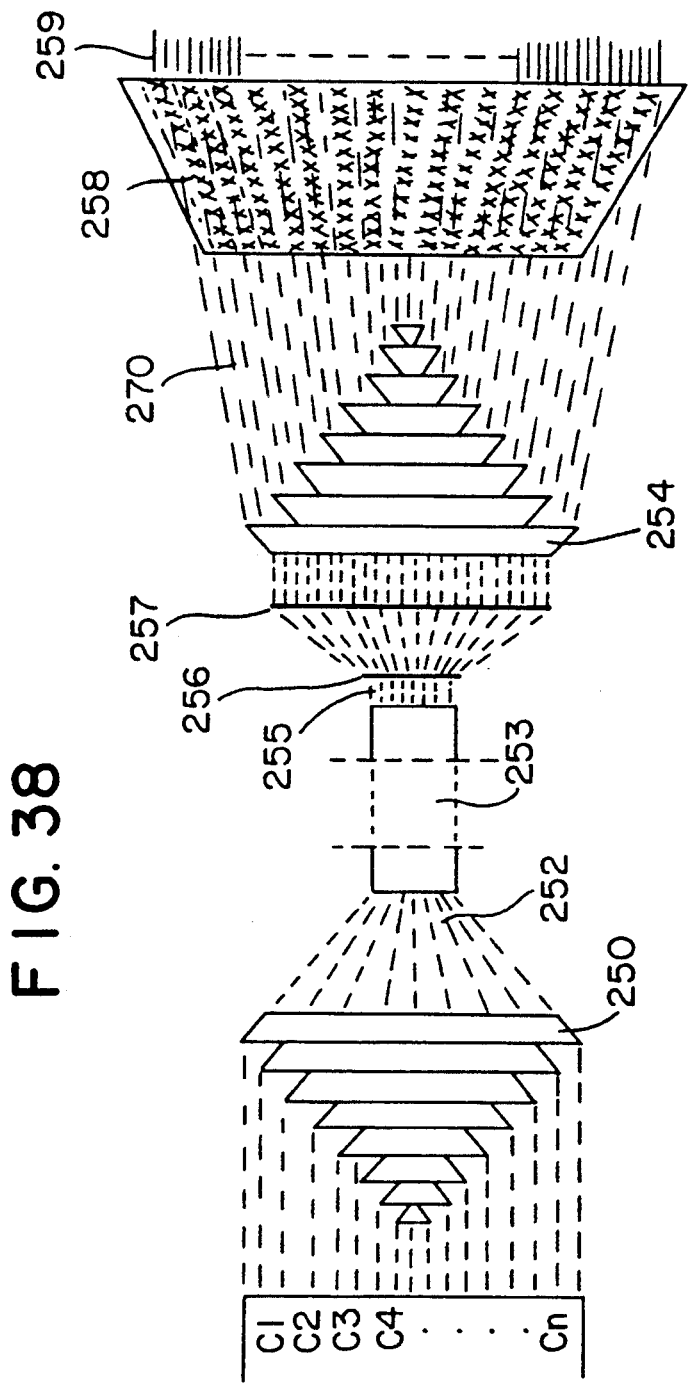
FIG. 38 is a schematic view of a multiplexing demultiplexing system using a generator in the converging mode as a multiplexer and a generator in a diverging mode as a demultiplexer.

Another approach to multiplexing and demultiplexing signals is to consider the converging properties of the generator lens 250 wherein, as shown in FIG. 38 all incoming light rays 251 converge to a point 252 or focus area which is applied to a fiber optic waveguide 253. Utilizing this approach, hundreds or thousands of incoming signals can be multiplexed, utilizing the principles of the instant invention. The generator lens 250 is designed to achieve the proper cone of acceptance angle for efficient coupling. Multiplexed signals are demultiplexed by a reverse or conjugated process by impinging the exiting light signals on the surfaces of a generator 254 operating as a diverging lens after diverging the multiplexed signal 255 through a diverging lens 256 and collimating the signal with a D-ring 257. The corresponding signals are then projected onto an array or grid 258 in spatial orientation. The array or grid 258 can be an nXm matrix array with corresponding fiber pigtails 259 positioned to accept the demultiplexed signals 270.

Figure 39:
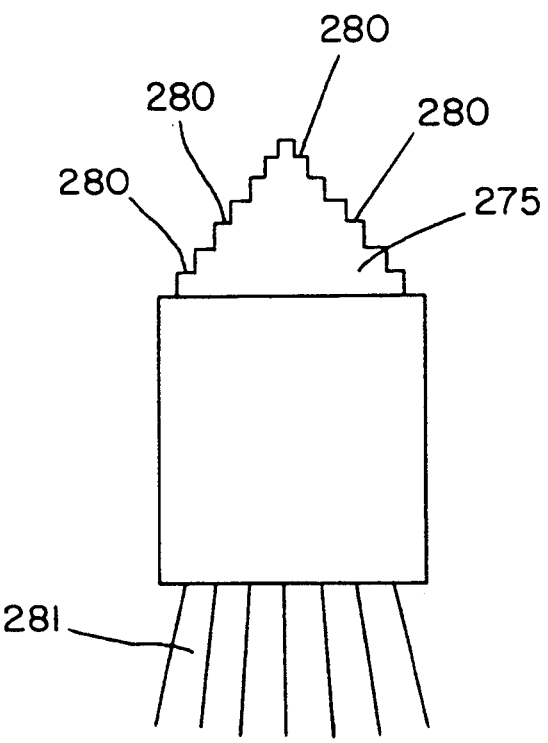
FIG. 39 is a side view of a fiber optic element configured into a stepped arrangement as a graded refractive index rod lens (GRIN)
Figure 40:
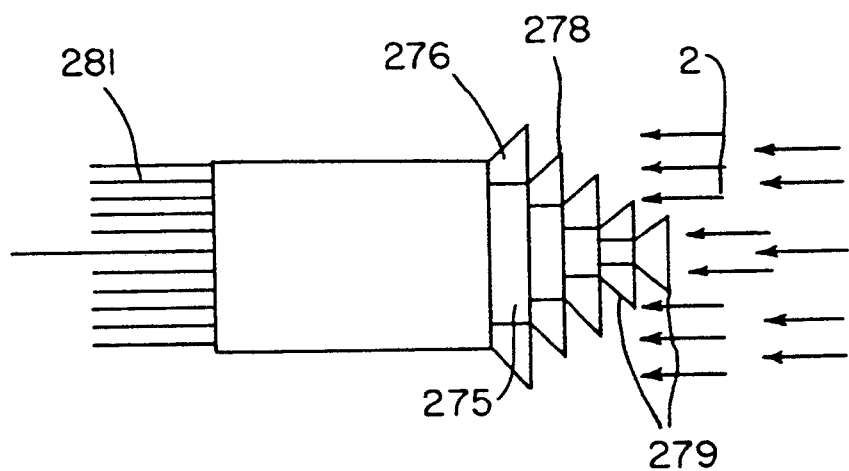
FIG. 40 is a side schematic view of the GRIN of FIG. 48 nested in a generator of the instant invention.

The properties of light and the physical properties of fiber optic cables are coordinated as shown below in FIG. 39 and 40 where a fiber optic cable end 275 or fiber optic device which can consist of a graded, refractive index lens, fiber terminus is notched or stepped down in pyramidical or conical fashion. This provides an application for a graded, refractive index, rod lens (GRIN). A multiplexer device is assembled by feeding the stepped GRIN rod 275 into the opening of a generator 276 as is shown in FIG. 40. Multiplexing of incoming light signals is achieved if the incoming signals are parallel or paraxial and are made to impinge on the converging side 278 of the generator 276, wherein each conical/pyramidal or polygonal section 279 refracts or difracts the incoming light to separate steps 280 (FIG. 48) along the axis of the GRIN rod 275 to thereby receive light from each of the multitude of steps. Each step 280 is focused to an adjoining fiber optic cable 281 in the larger adjoining GRIN rod lens. (See B. D. Metcalfe et al., *Applied Optics*, Vol. 21, No. 5, Mar. 1, 1982, and J. P. Lowde, "Wavelength Division Multiplexing-/Demultiplexing (WDM) Using Diffraction Gratings", SPIE Vol. 503, *Application, Theory and Fabrication of Periodic Structures*, pages 21–28, 1984, both incorporated herein by reference).

The generators in accordance with the instant invention are actually physical manifestations of the Fourier series in three dimensions. It is well established in classical optics theory that a simple lens will image an object by performing what is known as a Fourier transform of the object's signal or image. In that the generators according to the instant invention are lenses, they perform a Fourier transform, and therefore the generator is itself a type of optical processor. In addition, noting that the device is a three-dimensional manifestation of the Fourier series, complete with phase properties as well as periodicity, if one inspects the Fourier series equation, it is seen that the frequency component $w=2\pi/T$ or $w=2\pi/L$, which is the fundamental frequency. Therefore, all subsequent elements are merely integer multiples of the original signal's fundamental frequency. (See H. Hakemmaskhodi, *Discrete Fourier Transform and FFT*, pg. 77, 78, incorporated by reference.) In D. Baker, *Multimode Fiber Optic Design*, Chapter 12, page 456, line 2 (angular division multiplexing), it is clearly stated that "the rings do not need to be masked, the channels are separated with tuning at f1, f2, ... f: Technique lacks any large advantage over standard FDM which is frequency division multiplexing." Therefore, the instant invention by its very nature achieves a series of rings due to modelling via the Fourier series resulting in a natural fundamental frequency $w=2\pi/T$ or $w=n\pi/L$. This can correspond to the first generator section element. As the area of the pyramid/cone generator converges to a point, each successive element or generator section denotes an integer multiple of the fundamental frequency w. Therefore, each ring can equal a channel and each channel can have a different frequency.

Of specific interest with respect to the pyramid/cone generators of the instant invention is the technology of transmitting and manipulating solitons in optical fibers. As is set forth in the article by L. F. Mollenauer, Phil Trans. R. Soc. Land. A 315, 437–450 (1985), incorporated herein by reference, solitons are generated by mode-locked, short-pulse lasers.

In essence, it is possible by utilizing the principles of the instant invention to provide a system which simultaneously collects, separates and focuses light from information carrying optical fibers. By utilizing applicant's approach, the fibers can carry an increased information load because the holographic optical elements create several channels within the fiber for facilitating angular, frequency, wavelength and time multiplexing and demultiplexing.

I. Optical Computer Using Cone/Pyramid Processor

Figure 41:
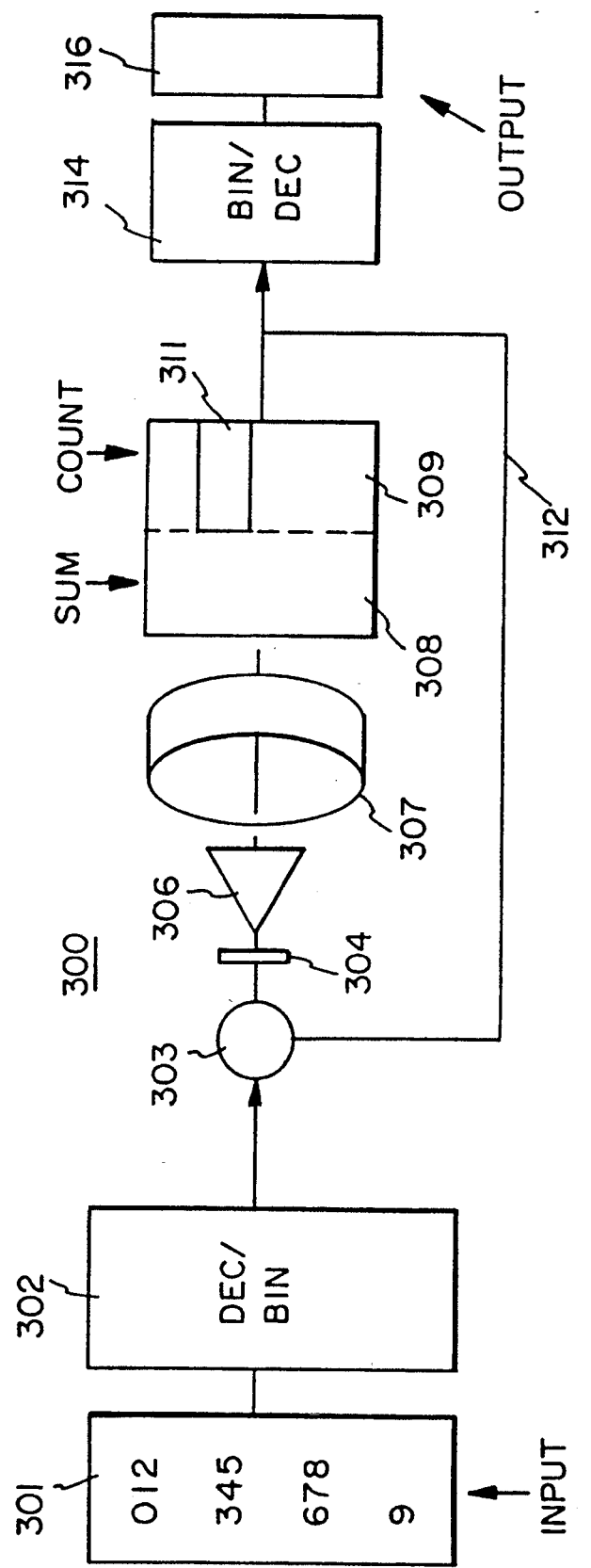
FIG. 41 is a schematic block diagram of an optical computer utilizing the conical or pyramidal optical generator of the instant invention.

Referring now to FIG. 41, there is shown an optical computer, designated generally by the numeral 300, which operates in accordance with the general principles set forth in Fainman et al. "Advances in Applying Nonlinear Optical Crystals to Optical Signal Processing," 1988, pp. 349–377. By utilizing the principles of the instant invention with known approaches, it is possible to readily perform parallel computations and global communications using active linear and nonlinear optical elements.

The information is put into the optical computer 300 by a keyboard 301 which has numerals 0–9 and typical instructions for multiplication, division, addition and subtraction. The output from the keyboard 301 is applied to an encoder 302 which converts the decimal input from the keyboard 301 to a binary coded decimal output which is applied through an optical adder 303 which may, for example, be a laser, and D-ring 304 before being applied through a conical or pyramidal generator 306 configured in accordance with the instant invention. The optical signal is then passed through an acceptor ring 307 and applied to a first optical summer 308 and optical counter 309. The output from the summer and counter, are applied through an adder 311, and are applied over feedback line 312 to the input 303. The final output from the optical summer 308 is also applied through to a binary-to-decimal decoder 314 and thereafter to a decimal output 316 which may have a screen, laser printer, or the like.

The essential objective of the computer 300 is to add, subtract, multiply, and divide by using the cone or pyramid 306 as a central processor. If an incoming signal impinges upon a mirrored cone, an output ring is formed. This ring will merely convey the input information assuming that the information is a binary 1 or 0. The acceptor ring 307 in the fiber optic circuit collects the 1's (pulses) and 0's (no pulses) and subsequently send the information to the counter/memory area 308, 309, which has the capacity or memory characteristics for this particular example. While a binary example is given, a three-sided pyramid generator would allow a trinary optical counter. Thereafter, the values are stored in the counter area 309. Optical "and" gates and "or" gates enable decisions to be made as to whether to loop through the fiber optic feedback circuit or to halt looping. The computer can have a timing mechanism or bound rate at which it accepts and outputs data. The optical computer operates with the following program:

```
       LOOP = LABEL
       MULTIPLICAND = #Y
       MULTIPLIER = #X
       SUM = 0
       COUNT = 0
       READ MULTIPLIER
       READ MULTIPLICAND
LOOP   SUM = SUM + MULTIPLICAND
       COUNT = COUNT + 1
       IF COUNT = MULTIPLIER
           THEN PRINT SUM
           ELSE GO TO LOOP
       END
       MULTIPLICAND = #Y
       MULTIPLIER = #X
       SUM = 0
       COUNT = 0
       READ MULTIPLIER
       READ MULTIPLICAND
       WHILE COUNT ≠ MULTIPLIER DO
           SUM = SUM + MULTIPLICAND
           COUNT = COUNT + 1
       END WHILE
       PRINT SUM
       STOP
```

According to the above program, the operations are halted if the condition is true (Count=Multiplier) for multiplication, then the computer merely outputs the information in the counter. A similar method is employed for addition, subtraction and division. Other functions such as exponentials, logs, matrices, trigonometric functions are also possible. One need only connect and multiply the basic circuit with additional feedback loops containing the appropriate elements needed for such functions, as is set forth in the Fainman et al. article.

The acceptor ring 307 is similar to the acceptor rings used in the fiber optic multiplexer/demultiplexer circuits for transmitting and receiving as discussed earlier in this application. It also can be cylindrical, polygonal, or rectangular nested structure, as indicated in this application. In that it will accept the pulse 1-or O-ring from a cone, similarly, a rectangle or square acceptor ring can be used where a pyramid with n sides is used as the generator. The ring can also have the appropriate nesting and number of sides to accept a plurality of pyramid pulses.

D-rings for pyramid cone generators and cylindrical lens D-rings can be used to direct light onto the conical or pyramidal generator sections. However, the D-ring can simply be configured as a collimated lens in that its function is merely to insure that paraxial parallel light rays impinge upon the generator on-axis. This can be achieved by a simple collimating lens or by a somewhat modified collimating lens. In addition, in some applications such as where the generator is used to perform optical computing, the normal D-ring 304 can be substituted for by a cylindrical lens. The use of a cylindrical lens is to enable the generator to easily access vertical or horizontal columns and rows of information on an array or to perform numerical arithmetic operations, including matrix vector multiplication as indicated in Reference: Applied Optics, Vol. 18, No. 2, Jan. 15, 1979, pp. 155–158.

The counter or memory storage area 308, 309 can be a Kerr cell or any general photoreactive real time element that is capable of the aforementioned functions. Also, the optical memory disk invented by Joseph Linmeyer and disclosed in U.S. Pat. Nos. 4,812,660 and 4,812,659, incorporated herein by reference, may provide an appropriate memory device.

The very nature of a generator allows it to demonstrate its lens properties. It is capable of displaying a Fourier transform of any object or image. In this respect, it behaves much as simple lenses in that a simple lens is capable of performing a Fourier transform of an object or image. In this respect, a simple lens is actually a type of optical computer. In the same respect, a generator is a type of optical computer. However, its properties are somewhat unique in that not only can it demonstrate a Fourier transform, but it also can demonstrate both multiplication and division. Considering a three-sided generator, if a pulse of light (1) impinges on its surface, it will multiply (accepts binary inputs 1 +0) this pulse signal by a factor of 3. If the generator is nested to a level of 10, the multiplication of a pulse of light will yield 30 rings or points of light. However, one can argue that this pulse has actually been divided by 30 and that a division of the pulse has occurred. This is also supported since the generator is made by essentially dividing a pyramid, polygon, or cone into a series of smaller sections utilizing the 1/n or 1/T Fourier period relationship. This contrasts with the fact that in multiplication, A/n is actually equal to A * 1/n, so that multiplication is used to achieve a division or, in essence, they have an inverse relationship. Likewise, the generators 306 naturally demonstrate this inverse relationship and easily demonstrate both the ability to multiply or divide any single or group of incoming light signals or pulses. In this respect, the generator 306 has the properties of an optical computer, especially if one considers that a trinary computer is possible utilizing a three-sided nested generator. Likewise, a decimal computer is possible if one utilizes a ten-sided nested generator 306. These facts must be considered when judging the practicality of a pyramid or cone optical computer as described in FIG. 41 of this patent application.

The optical computer generators 306 are also capable of utilizing the principles of residue arithmetic.

J. Other Generator Configurations

Figure 43:
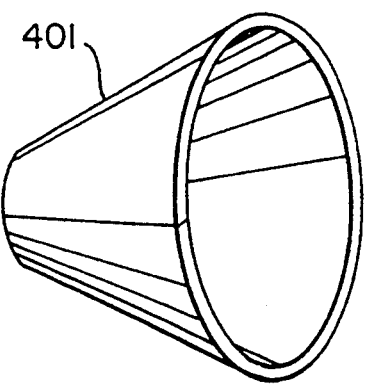
FIG. 43 is a perspective view showing the planar hologram of FIG. 51 configured as a cone.

It is readily apparent that the conical and pyramidal generators 20 and 30 of the instant invention have a number of applications such as a phased array satellite dish for focussing and transmitting and receiving EM radiation, but not limited to, holographic displays, optical connectors, optical multiplexers and demultiplexers and optical computers. In addressing these various uses, the cones and pyramids may have various configurations. While for many applications, a single layer mirrored surface or reflective surface 23 on the cones 21 or pyramids 31 of the generators 20 and 30 of FIGS. 1 and 4 are appropriate, the reflective surfaces may assume other configurations and be made of photorefractive materials. For example, the reflective surface 23 may be in the form of a holographic optical element, as is seen in FIG. 42. The hologram may be created on a flat surface 400, as is seen in FIG. 42, and rolled into a cone 401, as is seen in FIG. 43. Incident light or other electromagnetic radiation may be utilized to turn the hologram on and off and thus create images using the hologram to project images onto an aligned holographic plate, such as the holographic plate 43 (see FIG. 6).

Figure 45:
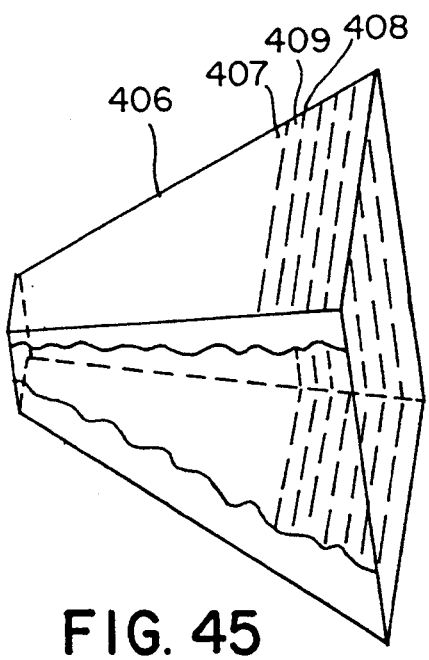
FIG. 45 is a view showing a further embodiment of the holographic elements of FIGS. 4-6, wherein each pyramidal element has a plurality of bands, with the bands having different transmission and absorption characteristics.
Figure 44:
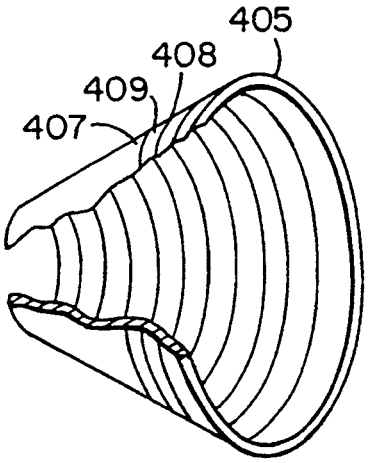
FIG. 44 is a further embodiment of the holographic elements of FIGS. 1-3, wherein the conical surface has alternating bands, each of which have different reflective, refractive, or diffractive absorption and transmission characteristics.

In FIGS. 44 and 45, there is shown an arrangement wherein the hollow truncated cones 405 and hollow truncated pyramids 406 comprising the generators of FIGS. 1 and 4 may be configured with alternating reflective surfaces, each separated by absorbing band. For example, the surface may have gold bands 407 for transmitting the infrared spectrum and silver bands 408 for transmitting the visible or white light spectrum. In some applications, the bands may be separated by a black band 409 which absorbs most portions of the spectrum being transmitted. With such an arrangement, the possibility of transmitting holographic information in opposite directions is enhanced so that the device can serve both as a transmitter and receiver of such information. For example, infrared information is transferred by reflection from the gold bands 407 in one direction, while information having wavelengths in the visible spectrum is transmitted in the opposite direction by the silver bands 408. This is also possible since the generator is both a diverging and converging lens.

The conical surface generators 20 of FIG. 1 and pyramidal surface generators 30 of FIG. 4 provide unique holographic devices which have applications for both displaying holograms and utilizing of holographic techniques in optical communication systems. The instant invention provides a coaxial generator while eliminating the zero-order, which allows the construction and operation of much smaller holographic devices while negating the vexing double-image problems and producing clear, precise images.

Figure 34:
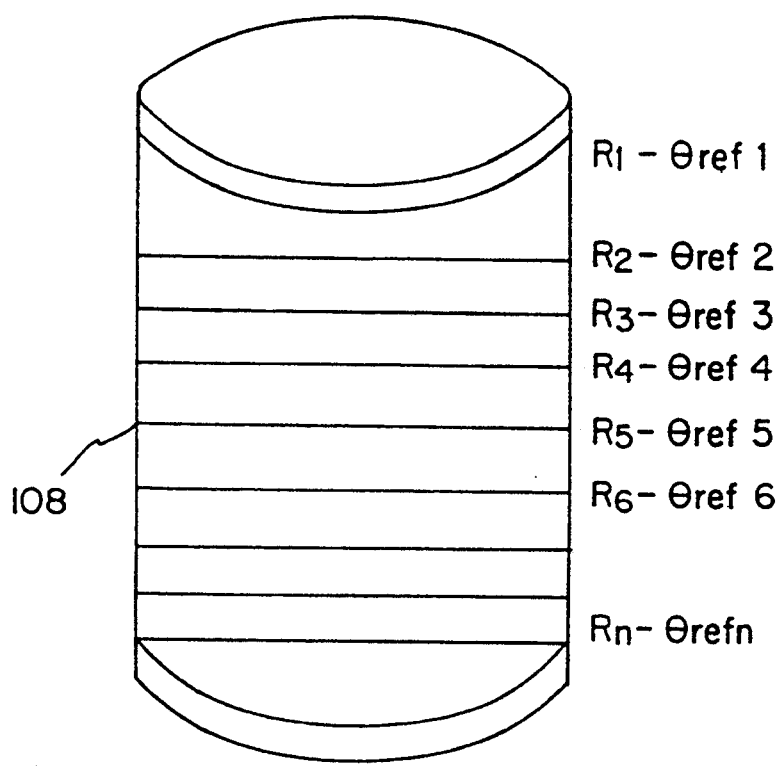
FIG. 34 is a schematic diagram showing a reflective surface for focusing optical information wherein an internal grating is utilized.
Figure 47:
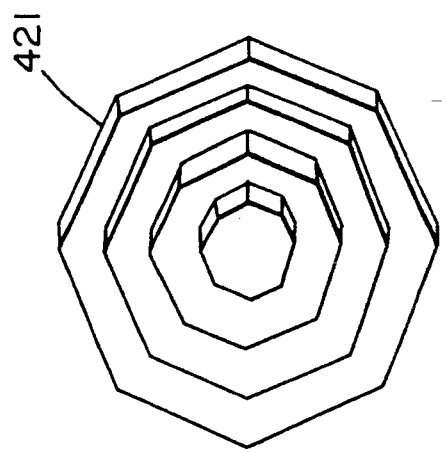
FIG. 47 is a perspective view of a nested generator receptor configured with multisided polygonal elements.
Figure 46:
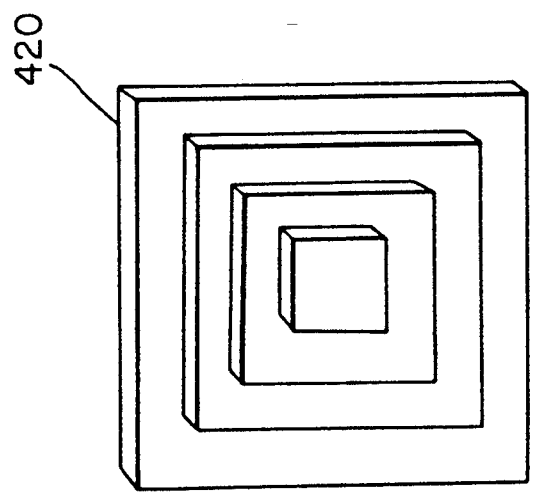
FIG. 46 is a perspective view of a nested generator acceptor configured with pyramidical elements.

Referring now to FIGS. 46 and 47, there are shown pyramidical and polygonal acceptor configurations 420 and 421, respectively, that are usable in a fashion similar to the cylindrical acceptor configurations of FIGS. 34, 35, and 37. In that the following relationship holds:

$$D = \frac{\lambda n}{\cos\theta A/B}$$

and $$\cos\theta = \max = +1 \text{ when } \theta = 0°$$

$$\cos 180° = \max = -1$$

a single color hologram is possible. This is because the separation of 180° in combination with the ability of the generators configured in accordance with the instant invention enable fringe formation essentially equidistant in spacing can result in only a selected wave being diffracted.

K. Additional Multiplexing/Demultiplexing Configurations

Figure 48:
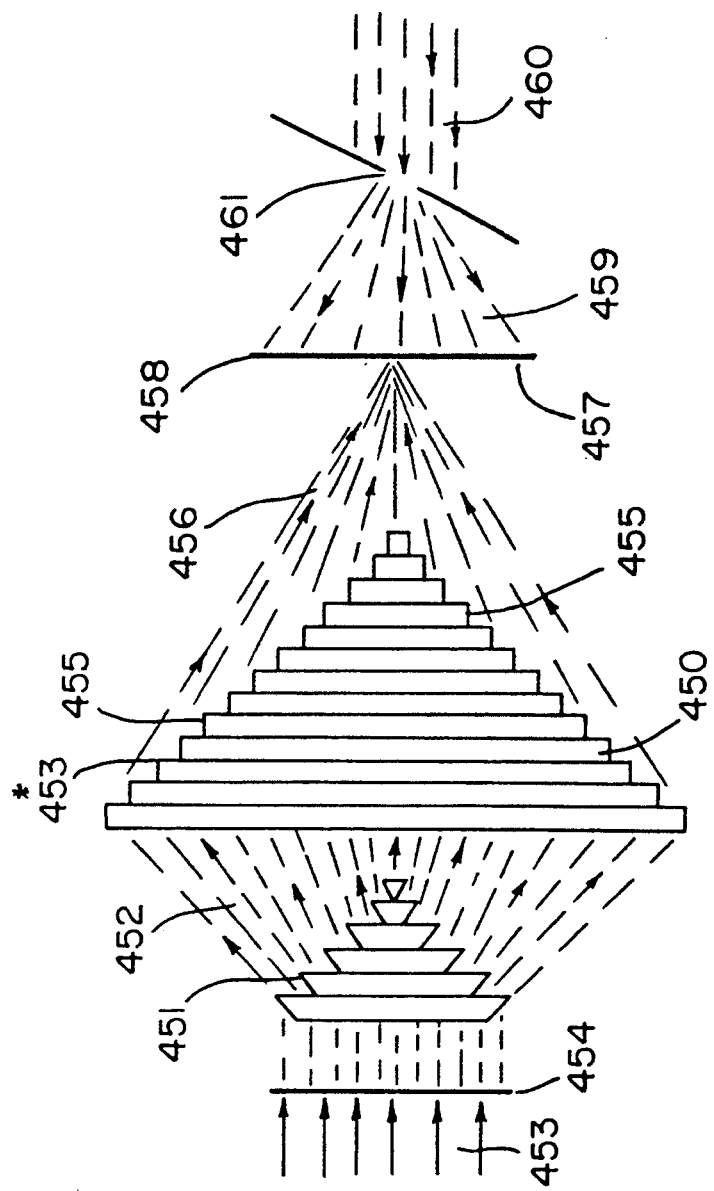
FIG. 48 is a schematic view of a hologram emulsion being developed using a cylindrical acceptor in alignment with a conical generator.
Figure 49:
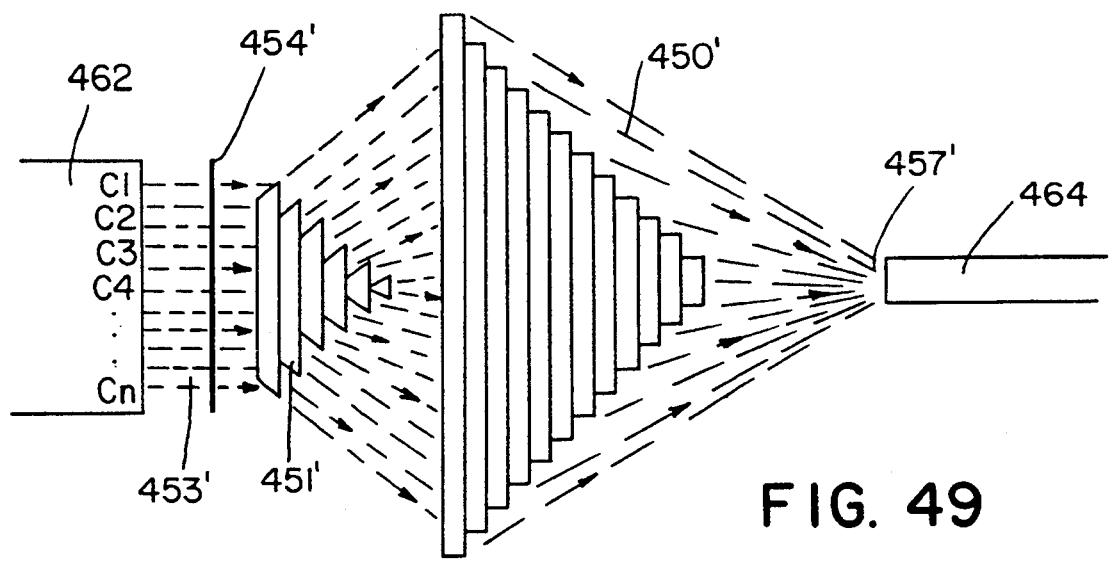
FIG. 49 is a schematic view of a multiplexer utilizing a cylindrical acceptor in alignment with a conical generator.
Figure 50:
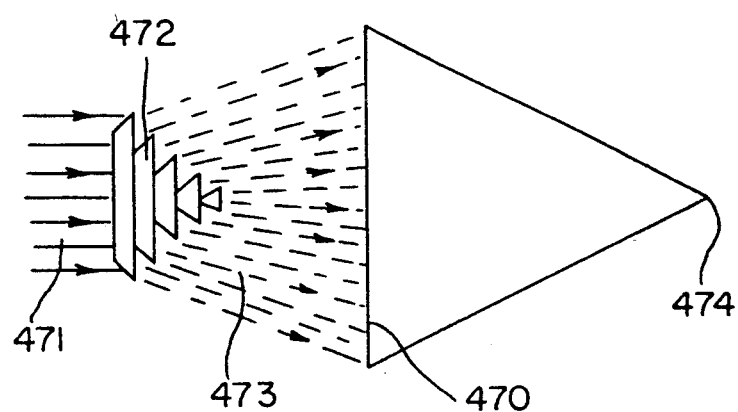
FIG. 50 is a schematic illustration showing a conical or pyramidical generator being focused via a hologram to produce a point image which is a conjugate of the generator.

Referring now to FIGS. 48–50, alternate methods of achieving conjugation is to reverse a nested cylindrical generator 450 (see also FIG. 36) and place the conical generator 451 as close as necessary to the cylindrical generator to enable the diverging rays 452 of a reference beam 453 collimated by a D-ring 454, or a collimator to refract off the interior of the nested cylindrical (reflective) generator elements 455. The thus reflected light rays 455 converge to a point 457. In creating a hologram, the point 457 is focussed on the hologram emulsion 458 as the reference beam while light rays 459 from an object beam 460 directed through an aperture 461 are impinged on the other side of the hologram emulsion plate. As is seen in FIG. 49, the arrangement of FIG. 48 is used to multiplex and focus optical signals 453' from a series of optical channels 462, which signals are collimated by D-ring 454'. The multiplexed signals are focussed at area 457' on a fiber optic wave guide 464 or a GRIN ROO lens.

Referring now to FIG. 50, there is shown a hologram 470 which has been created utilizing a generator in accordance with the principals of the instant invention. Collimated light rays 471 are direct at a conical/pyramidal generator 472 to create a diverging beam 473 which impinges on the hologram 470. The hologram 470 itself conjugates the wave to focus the image at focal point 474.

L. Further Examples of Practical Applications

1. Checkout Scanner Bar Code Reader—FIGS. 51 and 52

Conventional checkout scanners generally employ mechanical devices such as motors to generate a 2-dimension or 3-dimension scanning pattern. One such scanning system that is currently in use is the IBM 3687 super market checkout scanner. This particular device employs a series of hologram pie facets usually twenty set in four groups or sets of five sections per group. Of these five sections, each have variable, usually decreasing areas. (See U.S. Pat. Nos. 4,902,088 and 4,415,224, incorporated herein by reference.) The hologram pie facets are mounted on a disk which is spun at very high RPM to achieve a suitable scan pattern that literally wraps around the item to be scanned and reads its universal product code (UPC) or bar code. The reflected light follows a retroreflective path back through the hologram disk (after reflection from the UPC and mirror arrays). The light is detected by a photosensitive detector that detects the intensity or level of light reflected from the target area through a facet.

Figure 51:
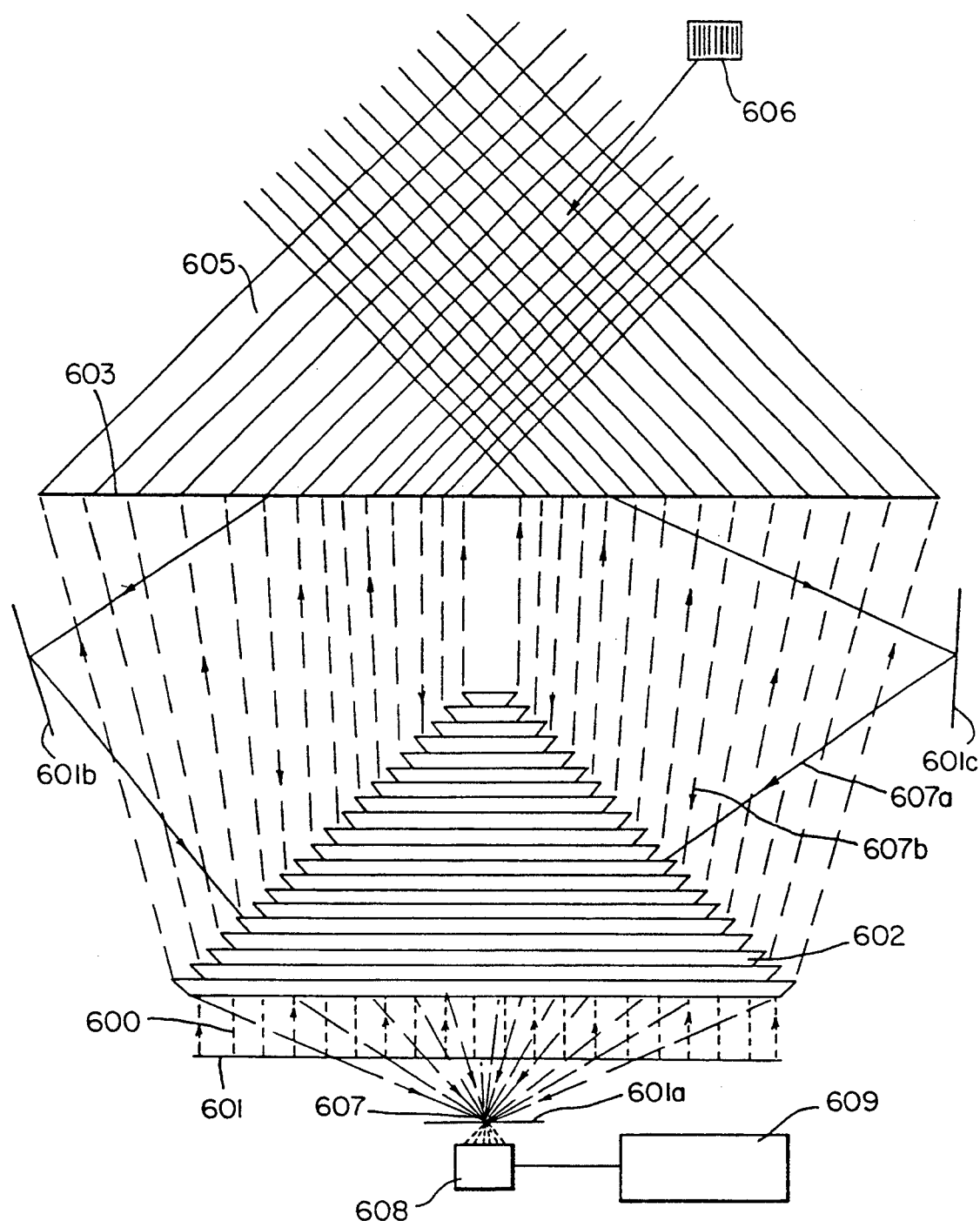
FIG. 51 is a schematic view of a bar code reader utilized as a checkout scanner.
Figure 52A:
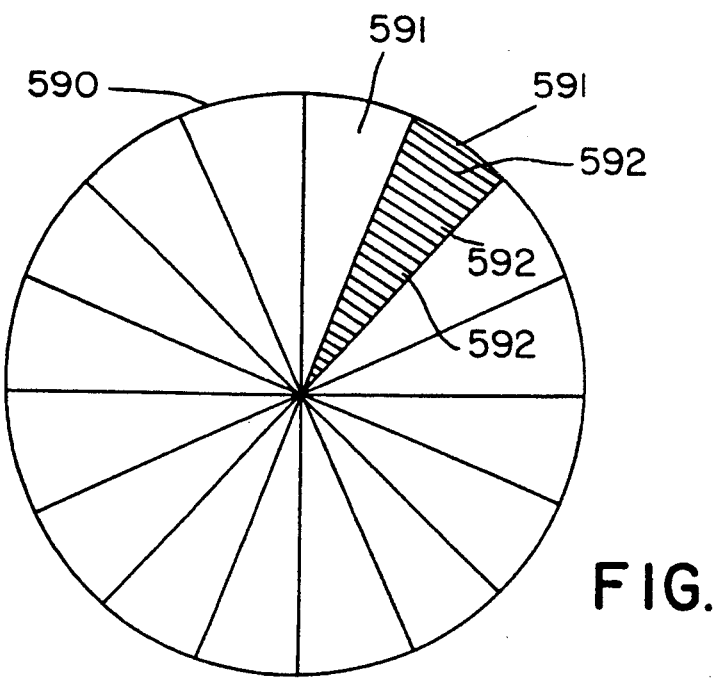
FIG. 52A and 52B is a planar view of a holographic fly's eye lens used with the scanner of FIG. 60 or any group of hologram elements.
Figure 52B:
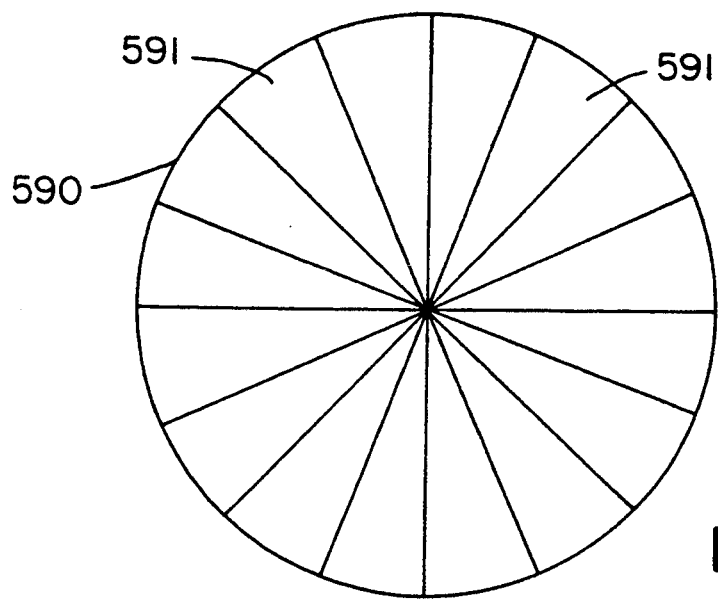

As seen in FIG. 51, the device in accordance with the instant invention is capable of producing a similar scan pattern. However, the beam 600 is spread so that it can be projected through a D-ring 600. From the D-ring 601, the beam 600 is projected onto a series of nested polygonal pyramids 602, wherein each truncated polygon thereof may have N-sides. For example, to emulate and possibly exceed the IBM model 3687, a nesting of 20×20 or a twenty sided polygon nested to a level of twenty provides the conjugate reference wave for hologram disk 590 shown in FIG. 52A having each pie sector 591 with a series of 20 individual holograms 592, each with decreasing areas. In another approach, which may yield a higher density of scan lines, the properties of a fly's eye lens may be used as detailed in the IBM Technical Disclosure 1967, page 2. A fly's eye lens grid with one hundred lenses (very small) configured to a nesting of twenty, as before, would provide two thousand lenses per pie shaped sector. With twenty sectors, forty thousand individual scan lines are provided. This of course requires a twenty sided generator nested to a level of twenty. This density can be further increased if the generator sides are increased. As is shown in FIG. 52B, the number of pie sectors 591 would then be correspondingly increased on the hologram disk 590. If the generator nesting is increased to forty, the total number of scan lines will increase to 40×100=4000 and 4,000×40=160,000 scan lines, which far exceeds normal scan line density requirements. Tradeoffs, of course, may have to be made in that the spread beam is spread thinner. To solve this problem, one need simply increase the power of the laser source by an appropriate level to compensate. The reflected beam from the bar code or UPC can be made to fall on the converging side of the generator as shown in FIG. 51 and made to converge to a point. Ultimately, the reflected beam returns to the photodetector and to the store's label decoding processing system (computer). Any number of additional mirrors and condenser lenses as is commonly known in the art can also be used to help collect and focus the retroreflected light onto the photodetector.

Considering the operation of the scanner of FIG. 51 further, it is seen that the beam of incident light 600 which has been collimated by the D-ring 601 and which may be either laser light or monochromatic light is passed through a pyramidal or conical generator 602 configured in accordance with the principals of the instant invention before impinging on a holographic plate or HOE-603. The holographic plate or HOES 603 are made using a generator in accordance with the principles of the instant invention (see FIGS. 13, 14, 28, 29 and 46 and accompanying discussion). The hologram creates a three-dimensional X, Y, and Z holographic reconstruction 605 which in effect simulates the motion of the rotating mirror of prior art bar code readers or check out scanners. The scan pattern is available over 180° and throughout 360° of the hologram disk assembly.

The scanned information from the bar code 606 is reflected back through the conical or pyramidal generator 602 in a retroreflective conjugate fashion so as to be focussed at a point 607 in a photodetector 608 which acts as a receiver to relay information to a label decoding system 609 in a fashion such as disclosed in U.S. Pat. No. 4,902,088, incorporated herein by reference.

With the approach of the instant invention, the bar code can be made smaller or hanger if desired. As is seen by FIG. 52A and 52B, the diffraction pattern 605 when created by any HOE or any HOE-fly's eye lens will have an increased density of lines and forms a pattern similar to optical line pattern 605.

2. Holographic Traffic Lights—FIG. 53

Figure 53C:
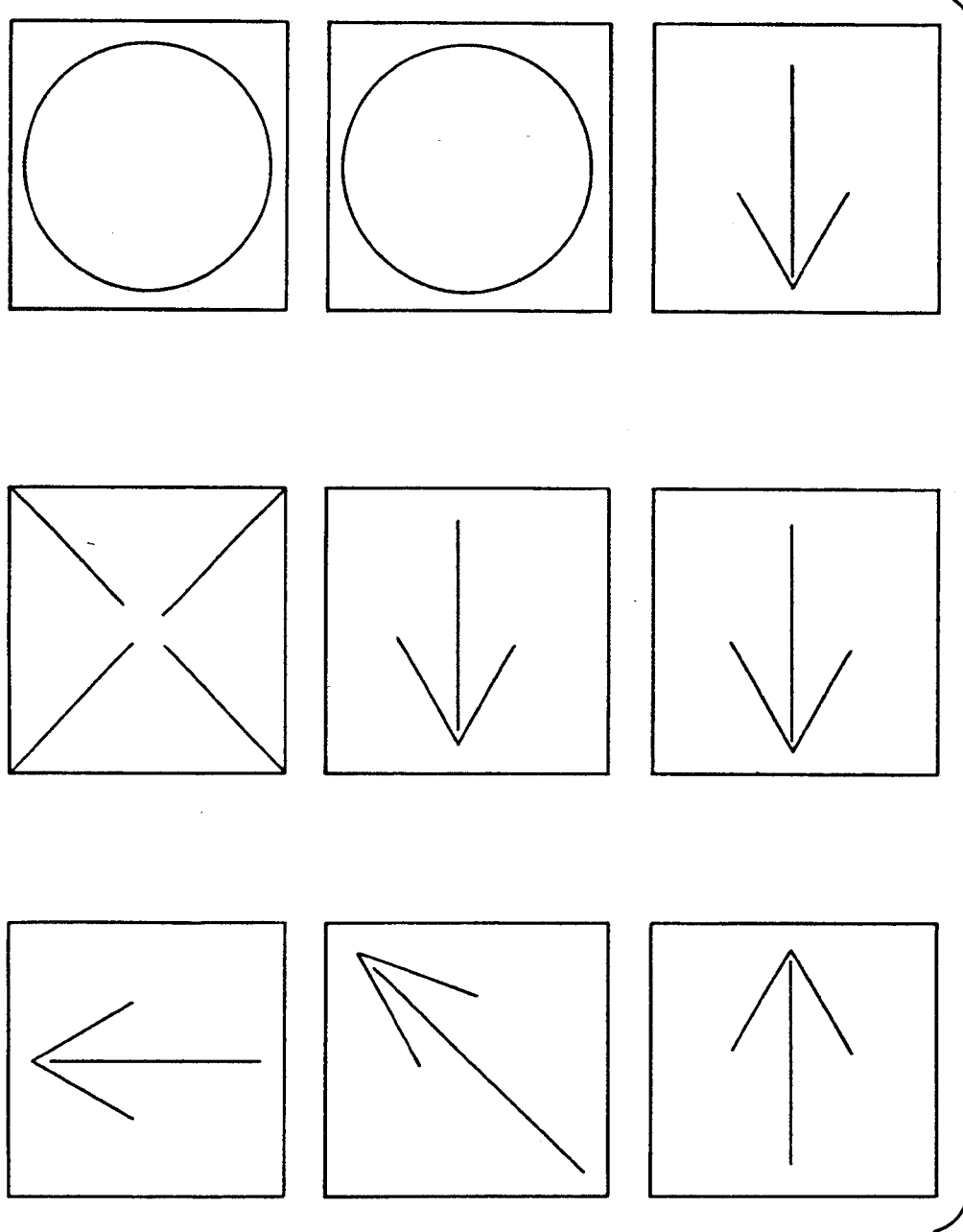

Referring now to FIG. 53, holographic traffic lights are designed to be retrofitted into a conventional optically programmable M-131 Model signal box as introduced by the 3M company in the late 1960's or any type box or assembly. The retrofit is accomplished by discarding the Fresnel lens; diffuser roundel. The optical limiter and the par lamp as a specific light source are both optional. The remaining items of the structure can be used as shown on page 6 of the 3-M Light Control Systems Catalogue incorporated herein by reference.

The new lens for the device is made by utilizing the generator according to the instant invention for hologram formation (see FIGS. 13, 14, 28 and 55 and accompanying discussion). If the object beam is desired to be a collimated light source (what drivers actually see), then the diverging and converging properties of the generator are used in that if the need is to block the zero-order light upon reconstruction or during normal operation of the traffic light, a diverging beam can be used. The generator is now used in its diverging mode and will reproduce the required object beam signal.

Referring now to FIG. 53A, the generator 700 is held rigid or fixed in housing 701. A modified D-ring 702 is used to replace the optical limiter of the 3-M device (optionally, D-ring can be a simple collimator) which is normally used to mask out unwanted areas of signal (vertical-horizontal visibility limiting) so that the signal is seen only in particular areas and by only selected lanes of traffic.

As is seen in FIG. 53, a light source 704 which may be a par lamp or laser or any type of light source is aligned with the D-ring 702. Optionally, a filter 706 is placed between the light source 704 and D-ring 702. The generator 700, configured according to the instant invention, is retained within the housing 701 by a plate 707 of any transparent material and directs the diverging rays 708 onto the holographic optical element or element(s) 709. As has been previously explained, the holographic optical element 709 is, in accordance with one embodiment of the invention, a hologram formed in an emulsion by an in-line or on-axis generator in a manner previously set forth herein (see experiments).

The resulting holographic light signal 710 is shielded by a visor 711 and designed to be visible only in specific areas of traffic lanes or in specific traffic lanes. An optical limiter can be used in some applications in conjunction with the generator and hologram lens signal.

As explained in the experiments in FIGS. 29B–29D, it is possible that the generator can be used to make the in-line holograms. However, in many applications, the resultant in-line hologram can be replayed on-axis, without using the generator for replay purposes. This will enable an easier retrofit for all existing optical systems. The applications to traffic are apparent in that any optically programmable signal box can be retrofitted with a hologram employing a generator to reconstruct the hologram by using the in-line hoe itself. The same techniques can be used in other holographic systems, including brake lights and virtually any system employing lens elements. In addition, any number of holographic lenses can be combined together employing the principles of the instant invention.

3. Head-up Displays (HUD's)—FIG. 63

Figure 54:
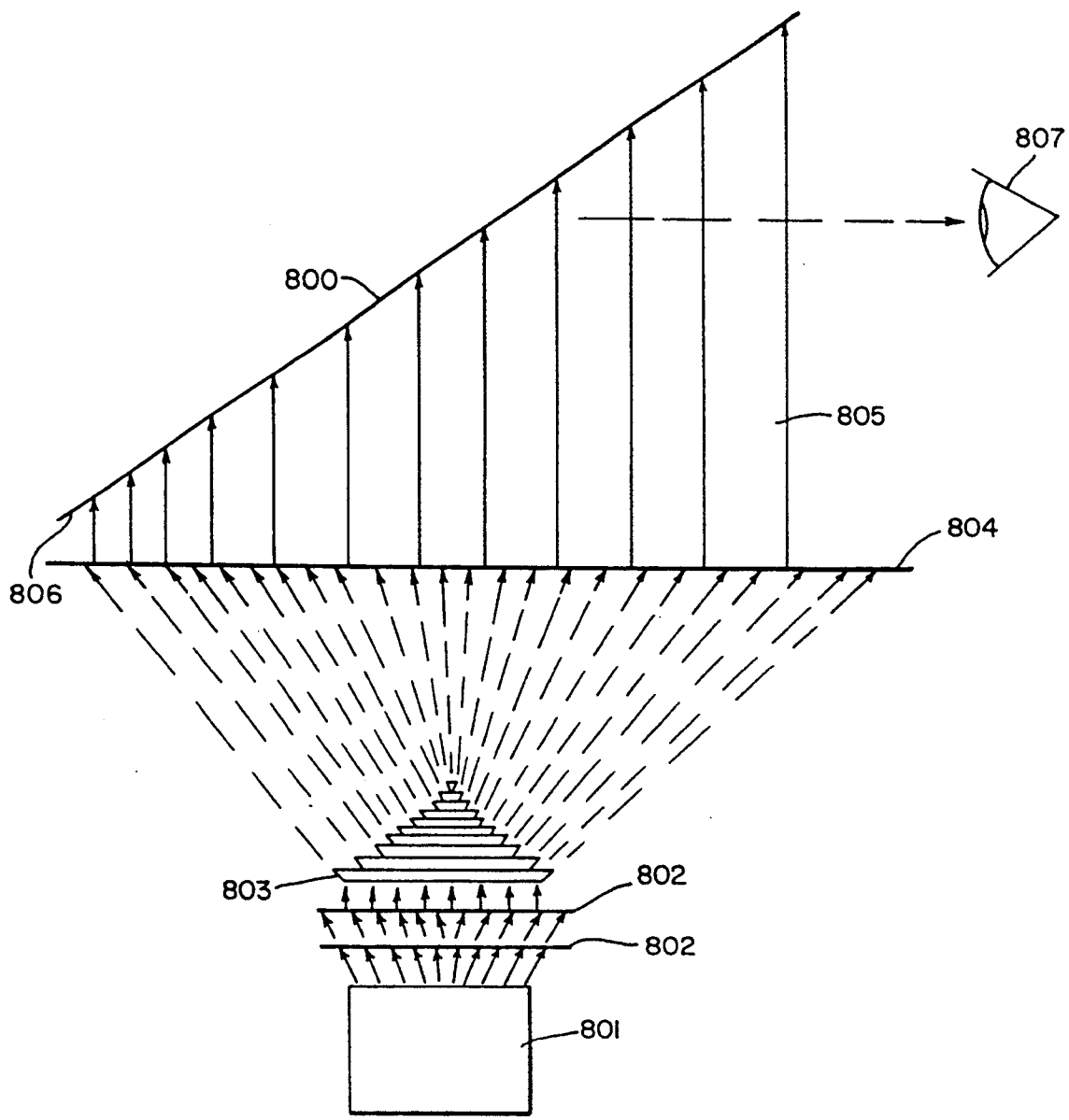
FIG. 54 is a side schematic view of a head-up display utilizing the generator and HOEs of the instant invention.
Figure 55:
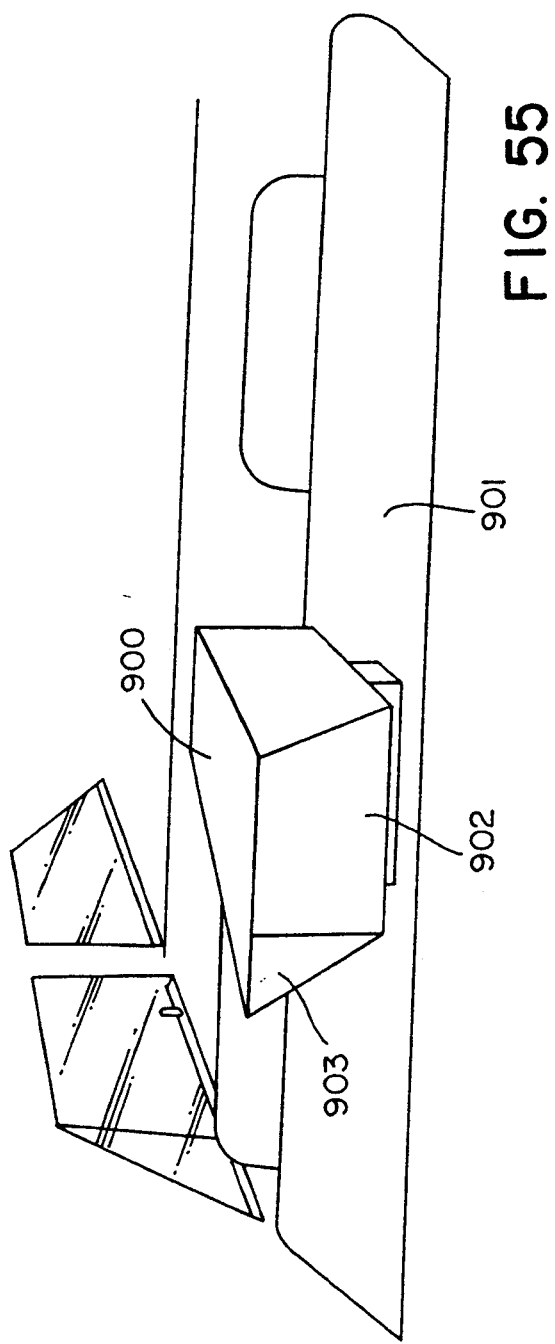
FIG. 55 is a perspective view of a brake light utilizing the principals of the instant invention.

Referring now to FIG. 54, there is shown a head-up display configuration for displaying information on a vehicular windshield 800 used in a car, truck, airplane or the like. The source of the image is a cathode ray tube (CRT) 801 which projects a collimated image of instrumentation or the like through relay lenses 802 onto a generator 803 oriented in a diverging mode. Light is diffracted by the generator 803 through an holographic optical element (HOE) 804 created by on-axis holography (see FIGS. 13, 14, 28 and 55 and accompanying discussion). The resulting collimated beam 805 impinges upon a combiner (HOE) 806 which is part of the windshield to display a hologram of the CRT image for the observer 807 who may, for example, be an airplane pilot or automobile driver. Some of the collimation power can, if necessary or desired, be built into the combiner HOE 806.

In accordance with one embodiment of the head-up display of FIG. 54, the pyramidical/conical generator used to reconstruct the image is a diverging beam generator and the holographic elements 804 are made with a suitable conjugate that is essentially the inverse of the diverging rays of the generator as used to block the zero order.

4. Holographic Brake Light—FIGS. 55 and 56

There is considerable interest by the automobile industry in holographic brake lights. One prior art approach under consideration is to laminate a holographic plate to the rear window of a vehicle. However, with this approach, there is no way to adequately control cutting the holograph on and off because there is the distinct possibility of the hologram being activated by sunlight or oncoming headlights resulting in an unsafe condition to say the least. The General Motors Corporation has developed an HOE brake light of the off-axis type in which the zero order problem is solved by projecting a beam from below the hologram so as to pass the zero order into the sky. This arrangement may well have the disadvantage of perhaps creating confusion on hills and in situations where a large semi-tractor trailer or bus is following a much smaller car resulting in a height difference allowing the driver to see only simple undiffracted light, thus causing confusion which may lead to accidents.

By configuring a brake light utilizing the principles of the instant invention, the aforedescribed disadvantages are avoided. Referring now to FIG. 64, there is shown a brake light 900 mounted on the rear deck 901 of a vehicle such as an automobile. The brake light 900 has a lens 902 configured as a holographic optical element. The lens 902 is shielded by a visor 903.

Figure 56:
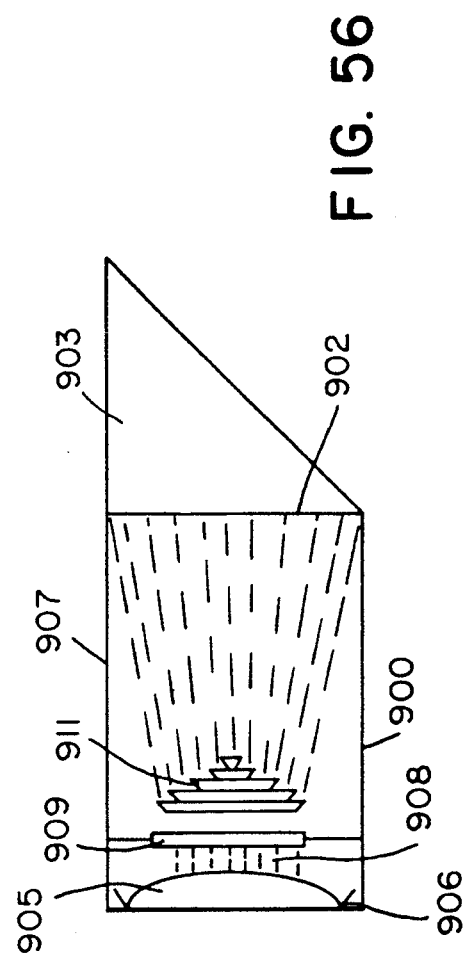
FIG. 56 is a side view of the light of FIG. 55 showing a generator and HOE of the instant invention incorporated into the light of FIG. 55.

Referring now to FIG. 56, where the brake light 900 is shown in cross section, a light source 905 which may optionally include a parabolic reflector 906 is enclosed in a housing 907 which is optically open only through lens 902. The light rays 908 from the light source 905 are passed through a red filter 909 and are collimated by a D-ring 910 (optional). A generator 911 oriented in a diverging mode is disposed between the D-ring 910 and holographic lens 902. The holographic lens 902 is created using the principals of FIGS. 13, 14, 28 and 55 and the accompanying discussion. By housing the arrangement in an opaque housing 907, the brake light 900 is nearly immune to external, ambient or stray light sources.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An apparatus for manipulating a beam of electromagnetic energy, said beam having a zero-order component, the apparatus comprising:
   a source for projecting the beam of electromagnetic energy;
   means for receiving the beam of electromagnetic energy; and
   at least one truncated pyramidal element having a plurality of aligned outer pyramidal and inner pyramidal surfaces nested one within the other with a at least one of said surfaces being a reflective surface, said truncated pyramidal surfaces being disposed between the source for projecting the beam and means for receiving the beam, the pyramidal surface being constructed and arranged so as to eliminate the zero-order component of the beam.

2. The apparatus of claim 1, wherein the aligned pyramidal surfaces are conical in that a cone is a pyramid with infinite sides.

3. The apparatus of claim 2, wherein the element comprises an array of cylindrical surfaces of different diameters having the same axis.

4. The apparatus of claim 3, wherein the cylindrical surfaces are stepped with respect to one another.

5. The apparatus of claim 1, wherein the electromagnetic energy is light.

6. An apparatus for manipulation of electromagnetic energy in the form of coaxial reference and object beams having a zero-order component, the apparatus comprising:
   means for projecting the beams of electromagnetic energy;
   means for receiving the beams of electromagnetic energy;
   means for eliminating the zero-order component, said means for eliminating the zero-order component comprising a plurality of aligned pyramidal elements having inner and outer pyramidal surfaces at least one of said surfaces being reflective, said surfaces combining to have a shape which satisfies the Dirchlet conditions necessary for representation by a three-dimensional Fourier series.

7. The apparatus of claim 6, wherein the truncated pyramids are truncated cones in that the pyramids have an infinite number of sides.

8. The apparatus of claim 6, wherein the truncated pyramids are supported in a nested configuration one within the other by optical struts which are transparent to the electromagnetic energy.

9. The apparatus of claim 8, wherein the optical struts include holograms as transmission elements.

10. The apparatus of claim 8, wherein the at least one of the inner and outer surfaces are holograms.

11. An apparatus for demultiplexing a multiplexed optical signal transmitted by an optical element, said apparatus comprising:
   means for projecting the multiplexed optical signal from the optical element;
   demultiplexing means aligned with the projecting means, the demultiplexing means comprising a plurality of aligned pyramidal elements having inner and outer pyramidal surfaces, at least one of said surfaces being reflective, said surfaces combining to have a shape which satisfies the Dirchlet conditions necessary for representation by a three-dimensional Fourier series, said demultiplexing means generating a demultiplexed output signal; and
   means juxtaposed with the demultiplexing means for receiving and utilizing the demultiplexed output signal.

12. The apparatus of claim 11, wherein the receiving means comprises a hologram aligned with the demultiplexing means and a second optical transmission element aligned with the hologram.

13. The apparatus of claim 12, wherein the optical transmission element conveys optical signals in both directions, toward and away from the demodulating means and wherein both the inner and outer surfaces of the truncated pyramidal elements are reflective to transmit and demodulate optical signals in both direction, the signals in both directions, the signals from the first optical element being reflected from one of the surfaces and the signals from the second optical element being reflected from the other surface.

14. The apparatus of claim 12, wherein the means juxtaposed with the demodulating means comprises a hologram aligned with the demodulating means and a multi-channel receiver optically connected with the hologram, the multi-channel receiver having a plurality of separate channels for transmitting therethrough components of the signal separated by demultiplexing.

15. The apparatus of claim 14, wherein the hologram is a planar hologram extending in a direction generally normal to the axis of the truncated pyramidal elements.

16. The apparatus of claim 14, wherein the hologram is a surface of revolution about the axis of the demodulating means.

17. The apparatus of claim 16, wherein the surface of revolution is cylindrical.

18. The apparatus of claim 16, wherein the surface of revolution is arcuate.

19. The apparatus of claim 12, wherein the means juxtaposed with the demodulating means is a cylindrical device having at least one inner reflective surface and wherein the multi-channel receiver is connected thereto by a plurality of optical leads.

20. The apparatus of claim 19, wherein the reflective surface is divided into a plurality of separate areas, each of which has an optical lead connected therewith.

21. The apparatus of claim 20, wherein the separate areas extend axially.

22. The apparatus of claim 21, wherein the separate areas are annular.

23. An optical computer comprising:
input means providing pulsed optical signals;
a pyramidal generator means comprising at least one truncated pyramidal element having outer pyramidal and inner pyramidal surfaces with at least one of said surfaces being a reflective surface, said pyramidal generator means being disposed in axial alignment with the input means;
an acceptor ring axially aligned with the pyramidal generator for collecting the pulsed optical signals;
counter/memory means for counting and storing the pulsed optical signals and for providing output signals in accordance with the logic therein;
an optical feedback circuit for looping the output signals of the counter/memory means back through the generator, acceptance ring and counter/memory; and
output means connected to the counter/memory means for utilizing output signals from the counter/memory means.

24. The apparatus of claim 23, wherein the pyramidal generator means comprises a plurality of nested pyramidal elements.

25. An apparatus for making a hologram, the apparatus comprising:
means for generating a reference beam along an axis extending in a first direction;
means for modulating the reference beam, said modulation means comprising a plurality of axially aligned pyramidal elements having inner and outer pyramidal surfaces, at least one of said surfaces being reflective, said surfaces combining to have a shape which satisfies the Dirchlet conditions necessary for representation by a three-dimensional Fourier series;
a holographic emulsion having first and second opposed surfaces and being disposed in alignment with the modulating means for receiving the reference beam as modulated by the modulating means on the first surface of the holographic emulsion; and
means for generating an object beam, said object beam generating means positioned to impinge the object beam on the second surface of the holographic emulsion.

26. The apparatus of claim 25, wherein the pyramidal elements each substantially have an infinite number of sides so as to define cones.

27. A method of manipulating a beam of electromagnetic radiation wherein the beam is comprised of a reference beam and an object beam and wherein the beam includes a zero-order component, the method comprising the step of minimizing the zero-order component by impinging the beam axially on a nested array of aligned pyramidal elements, each having inner and outer pyramidal surfaces, at least one of said surfaces being reflective, said surfaces combining to have a shape which satisfies the Dirchlet conditions necessary for representation by a Fourier series.

28. The method of claim 27, including the step of absorbing the radiation on the inner surfaces of the cone.

29. The method of claim 28, wherein the radiation is absorbed over a spectrum which extends beyond both the lower and upper ends of the visible spectrum by a layer of melanin.

30. The method of claim 27, wherein the pyramidal elements have substantially an infinite number of sides so as to be configured as cones.

31. An apparatus for demultiplexing a multiplexed optical signal transmitted by an optical element, said apparatus comprising:
means for projecting the multiplexed optical signal from the optical element;
demultiplexing means aligned with the projecting means, the demultiplexing means comprising a plurality of aligned optical elements having inner and outer pyramidal surfaces, at least one of said surfaces being reflective, said surfaces combining to have a shape which satisfies the Dirchlet conditions necessary for representation by a three-dimensional Fourier series, said demultiplexing means generating a demultiplexed output signal; and
means juxtaposed with the demultiplexing means for receiving and utilizing the demultiplexed output signal.

32. The apparatus of claim 31, wherein the receiving means comprises a hologram aligned with the demultiplexing means and a second optical transmission element aligned with the hologram.

33. The apparatus of claim 32, wherein the optical transmission element conveys optical signals in both directions, toward and away from the demodulating means and wherein both the inner and outer surfaces of the optical elements are reflective to transmit and demodulate optical signals in both direction, the signals in both directions, the signals from the first optical element being reflected from one of the surfaces and the signals from the second optical element being reflected from the other surface.

34. The apparatus of claim 32, wherein the means juxtaposed with the demodulating means comprises a hologram aligned with the demodulating means and a multi-channel receiver optically connected with the hologram, the multi-channel receiver having a plurality of separate channels for transmitting therethrough components of the signal separated by demultiplexing.

35. An apparatus for making a hologram the apparatus comprising:
 means for generating a reference beam along an axis extending in a first direction;
 means for modulating the reference beam, said modulation means comprising a plurality of axially aligned optical elements having inner and outer optical surfaces, at least one of said surfaces being reflective, said surfaces combining to have a shape which satisfies the Dirchlet conditions necessary for representation by a three-dimensional Fourier series;
 a holographic emulsion having first and second opposed surfaces and being disposed in alignment with the modulating means for receiving the reference beam as modulated by the modulating means on the first surface of the holographic emulsion; and
 means for generating an object beam, said object beam generating means positioned to impinge the object beam on the second surface of the holographic emulsion.

36. A method of manipulating a beam of electromagnetic radiation wherein the beam is comprised of a reference beam and an object beam and wherein the beam includes a zero-order component, the method comprising the step of minimizing the zero-order component by impinging the beam axially on a nested array of aligned optical elements, each having inner and outer surfaces, at least one of said surfaces being reflective, said surfaces combining to have a shape which satisfies the Dirchlet conditions necessary for representation by a Fourier series.

* * * * *